US008001226B2

(12) United States Patent
Matsumoto et al.

(10) Patent No.: US 8,001,226 B2
(45) Date of Patent: Aug. 16, 2011

(54) SURPLUS DETERMINATION SYSTEM, MANAGEMENT SYSTEM, RECORDING MEDIUM STORING SURPLUS DETERMINATION PROGRAM, AND RECORDING MEDIUM STORING MANAGEMENT PROGRAM

(75) Inventors: Yasuhide Matsumoto, Kawasaki (JP); Masatomo Yasaki, Kawasaki (JP); Masashi Uyama, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 1470 days.

(21) Appl. No.: 11/235,237

(22) Filed: Sep. 27, 2005

(65) Prior Publication Data

US 2007/0002747 A1    Jan. 4, 2007

(30) Foreign Application Priority Data

Jun. 29, 2005   (JP) .................. 2005-190614

(51) Int. Cl.
*G06F 15/173* (2006.01)
*G06F 11/00* (2006.01)

(52) U.S. Cl. ........ 709/223; 709/224; 709/225; 709/226; 370/236.1; 714/47.1

(58) Field of Classification Search .................. 709/223, 709/224, 225, 226; 370/236.1, 236.2; 714/47, 714/47.1
See application file for complete search history.

(56) References Cited

U.S. PATENT DOCUMENTS

| 6,560,717 | B1 * | 5/2003 | Scott et al. ...................... 714/4 |
| 7,155,018 | B1 * | 12/2006 | Stokes et al. ............. 379/406.01 |
| 2002/0059427 | A1 * | 5/2002 | Tamaki et al. ................ 709/226 |
| 2003/0069972 | A1 | 4/2003 | Yoshimura et al. |
| 2003/0073927 | A1 * | 4/2003 | Johansen et al. .............. 600/559 |
| 2004/0194061 | A1 * | 9/2004 | Fujino .......................... 717/120 |
| 2005/0102674 | A1 * | 5/2005 | Tameshige et al. ........... 718/100 |
| 2005/0286443 | A1 * | 12/2005 | McMillen et al. ............ 370/260 |
| 2006/0230106 | A1 * | 10/2006 | McDonald, Jr. .............. 709/204 |

FOREIGN PATENT DOCUMENTS

| JP | 5-197500 A | 8/1993 |
| JP | 9-091158 A | 4/1997 |
| JP | 2002-24192 | 1/2002 |
| JP | 2003-124976 | 4/2003 |
| JP | 2004-302937 | 10/2004 |

OTHER PUBLICATIONS

"Japanese Office Action", mailed Jan. 15, 2009, in corresponding Japanese Patent Application No. 2005-190614.
Japanese Office Action mailed on Sep. 2, 2008 for corresponding Japanese patent application No. 2005-190614.

* cited by examiner

*Primary Examiner* — Ahmad F Matar
*Assistant Examiner* — Nafiz E Hoque
(74) *Attorney, Agent, or Firm* — Fujitsu Patent Center

(57) ABSTRACT

A surplus determination system for determining a presence/absence of a surplus in an IT resource managed by an IT resource management system includes a recording part for recording working data representing a working situation of the IT resource, a recording part for recording a surplus determination rule representing a requirement of the working situation for the IT resource to be determined to have a surplus, and a surplus determining part for determining that there is a surplus in the case where the working situation represented by the working data satisfies the requirement of the working situation represented by the surplus determination rule, based on the working data and the surplus determination rule.

10 Claims, 20 Drawing Sheets

```
<?xml version="1.0" encoding="UTF-8"?>
<ITResources xmlns:xsi="http://www.w3.org/2001/XMLSchema-instance"
 xsi:noNamespaceSchemaLocation="http://idc.fujitsu.com/it_resource.xsd">

<ITResourceEvaluationItem profile_id="A Company">

<SupplyConditionRuleItem id="1">

<RefITResourceItem>
      <URI>uri://idc.fujitsu.com/Company_A/ITResource_1</URI>
      <OtherInfo/>
    </RefITResourceItem>                                              } D <PeriodType>
       <PeriodConditoin>
         <TimeItem>
           <TimeKey>Day</TimeKey>
           <TimeValue>0:00-7:00</TimeValue>
           <TimeEvaluator>uri://idc.fujitsu.com/TimeEvaluator</TimeEvaluator>
         </TimeItem>                                                  } E1
         <TimeItem>
           <TimeKey>Week</TimeKey>
           <TimeValue>!Satureday and !Sunday</TimeValue>
           <TimeEvaluator>uri://idc.fujitsu.com/TimeEvaluator</TimeEvaluator>
         </TimeItem>                                                  } E2
       </PeriodConditoin>
    </PeriodType>

<ResourceType>
      <ResourceItem>
        <ResourceKey>CPU</ResourceKey>
        <ResourceValue><30%</ResourceValue>
          <ResourceEvaluator>uri://idc.fujitsu.com/ConditionEvaluator</ResourceEvaluator>
      </ResourceItem>                                                 } F
    </ResourceType>

</SupplyConditionRule>

</ITResourceEvalutaionItem>

</ITResources>
```

Determination Rule #1

FIG. 10

| IT resource | Minimum unit | Range |
|---|---|---|
| CPU use ratio | 10% unit | 0~100% |
| HDD | 300 GB unit | 0~3TB |
| Transaction | 10,000 Trans unit | 0~100,000 Trans |

SURPLUS DETERMINATION SYSTEM, MANAGEMENT SYSTEM, RECORDING MEDIUM STORING SURPLUS DETERMINATION PROGRAM, AND RECORDING MEDIUM STORING MANAGEMENT PROGRAM

BACKGROUND OF THE INVENTION

1. Field of the Invention

The present invention relates to a management system for controlling a plurality of IT (Information Technology) resources respectively operated by a plurality of operating entities in accordance with a request from each operating entity, and a surplus determination system connected to the management system, for determining the presence/absence of a surplus in the IT resource.

2. Description of Related Art

For example, in a facility such as an Internet data center (hereinafter, referred to as an IDC), an IT resource is working in each business system operated by a plurality of operating entities. The IDC takes care of an IT resource, such as a server, a storage, and a network, constituting each business system, and provides a connection line to the Internet, maintenance•operation service, and the like.

In particular, the IDC capable of increasing/decreasing an IT resource assigned to each business system in accordance with needs on demand is called an IDC of a utility system. In the management system for managing these IT resources, there is a demand that IT resources in a plurality of business systems are utilized efficiently.

For example, JP 2002-24192 A discloses a method for allowing a management server to automatically change an IT resource assigned for each operating entity in accordance with a load in the IDC. According to this method, a load distribution apparatus is used, which receives a processing request packet from a user of an IT resource, and distributing the processing requested from the user into a plurality of IT resources. In the load distribution apparatus, for each user using an IT resource, an assignment definition table representing an IT resource used by the user is set. The management server dynamically changes the assignment definition table, whereby the assignment of IT resources is changed automatically in accordance with a load.

SUMMARY OF THE INVENTION

However, in the above-mentioned conventional method, the management server merely changes the assignment of IT resources automatically, and IT resource flexibility among a plurality of business systems is not considered. More specifically, there is no mechanism for distributing the surplus of an IT resource in each business system among the business systems. Therefore, in the conventional IDC, the IT resources of all the business systems are not always used 100%, so that a surplus IT resource is present. Therefore, it is necessary to determine a surplus of an IT resource in each business system in order to utilize the IT resource efficiently.

In each business system, an IT resource to be a surplus varies depending upon the administration policy and the countermeasures against risk of the operating entity operating each business system. Therefore, there is a problem that it is difficult to calculate a surplus automatically from the working rate of the system constituted by the IT resource.

In order to solve the above-mentioned problems, the object of the present invention is to provide a surplus determination system capable of determining the presence/absence of a surplus of an IT resource, a management system connected to the surplus determination system, a surplus determination program, and a management program.

A surplus determination system constituted with a computer according to the present invention for determining a presence/absence of a surplus in an IT resource is connected to a management system constituted with a computer having a function of, among a plurality of IT resources working respectively in a plurality of business systems constituted with a computer operated independently, supplying a surplus of the IT resource in any one of the business systems to another business system that lacks the IT resource. The surplus determination system includes a working data recording part for recording working data representing a working situation of the IT resource, a surplus determination data recording part for recording surplus determination data in which a surplus determination rule representing a requirement of the working situation for the IT resource to be determined to have a surplus is described, and a surplus determining part for reading the working data recorded in the working data recording part and the surplus determination data recorded in the surplus determination data recording part, and determining a presence/absence of a surplus in the IT resource, based on whether or not the working situation represented by the working data satisfies the requirement of the working situation represented by the surplus determination rule.

The surplus determining part compares the working situation represented by the working data with the surplus determination rule represented by the surplus determination data to determine the presence/absence of a surplus. Therefore, the presence/absence of a surplus is determined in accordance with the working situation of the IT resource. More specifically, the surplus determining part can determine the presence/absence of a surplus in real time during working of the IT resource. Furthermore, the surplus determining part determines the presence/absence of a surplus based on the surplus determination data. Therefore, by setting the surplus determination rule represented by the surplus determination data for each business system, the determination suitable for each business system can be performed. For example, an operating entity operating a business system can reflect a circumstance, such as an operating policy and countermeasures against risk, varying depending upon the business system, on the surplus determination rule. Consequently, the surplus determining part can perform the determination suitable for the circumference of each business system.

The management system constituted with a computer according to the present invention is connected to the surplus determination system of the present invention. The management system includes a supply condition accumulating part for accumulating the supply condition data output from the submitting part of the surplus determination system, a demand condition accumulating part for accumulating demand condition data representing a demand condition under which the business system that lacks the IT resource demands a shortage of the IT resource, a matching part for extracting supply condition data and demand condition data that are matched with each other, from the supply condition data accumulated in the supply condition accumulating part and the demand condition data accumulated in the demand condition accumulating part, and an assigning part for setting the IT resource that can be supplied, represented by the supply condition data extracted by the matching part in a state workable by the business system related to the demand condition data extracted by the matching part.

The matching part extracts the supply condition and the demand condition that are matched with each other, from the supply condition accumulating part in which the supply condition data is accumulated and the demand condition accumulating part in which the demand condition data is accumulated. The assigning part sets the IT resource under the extracted supply condition in a state workable by the business system under the extracted demand condition. More specifically, the assigning part lends the surplus IT resource to the business system that lacks the IT resource. Consequently, by utilizing a surplus IT resource in a business system, a shortage of an IT resource in another business system can be compensated. Thus, by distributing a surplus of an IT resource in each business system among business systems, the IT resources in a plurality of business systems operated independently can be used efficiently.

A surplus determination program recorded on a recording medium according to the present invention allows a computer to execute processing of determining a presence/absence of a surplus in an IT resource, the computer being connected to a management system having a function of, among a plurality of IT resources working respectively in a plurality of business systems operated independently, supplying a surplus of the IT resource in any one of the business systems to another business system that lacks the IT resource. The program allows the computer to execute working data input processing of inputting working data representing a working situation of the IT resource and recording it in a working data recording part, surplus determination data recording processing of recording surplus determination data, in which a surplus determination rule representing a requirement of the working situation for the IT resource to be determined to have a surplus is described, in a surplus determination data recording part, and surplus determining processing of reading the working data recorded in the working data recording part and the surplus determination data recorded in the surplus determination data recording part, and determining a presence/absence of a surplus in the IT resource, based on whether or not the working situation represented by the working data satisfies the requirement of the working situation represented by the surplus determination rule.

A management program recorded on a recording medium according to the present invention allows a computer connected to the surplus determination system of the present invention to execute processing of, among a plurality of IT resources working respectively in a plurality of business systems operated independently, supplying a surplus of the IT resource in any one of the business systems to another business system that lacks the IT resource. The program allows the computer to execute supply condition accumulating processing of accumulating the supply condition data output from the submitting part of the surplus determination system in a recording part, demand condition accumulating processing of accumulating demand condition data representing a demand condition under which the business system that lacks the IT resource demands a shortage of the IT resource, in the recording part, matching processing of extracting supply condition data and demand condition data that are matched with each other, from the supply condition data and the demand condition data accumulated in the recording part, and assigning processing of setting the IT resource that can be supplied, represented by the supply condition data extracted in the matching processing in a state workable by the business system related to the demand condition data extracted in the matching processing.

According to the present invention, a surplus determination system capable of determining the presence/absence of a surplus of an IT resource, a management system connected thereto, and a surplus determination program and a management program can be provided.

"IT resource" is hardware and/or software constituting a system. The IT resource includes, for example, a server, middleware, a network, a storage, various terminals (a personal computer, a PDA, a mobile telephone, etc.), and an RFID tag.

BRIEF DESCRIPTION OF THE DRAWINGS

FIG. 10 shows an example of specific data of the surplus determination rule.

DETAILED DESCRIPTION OF THE INVENTION

Figure 1:
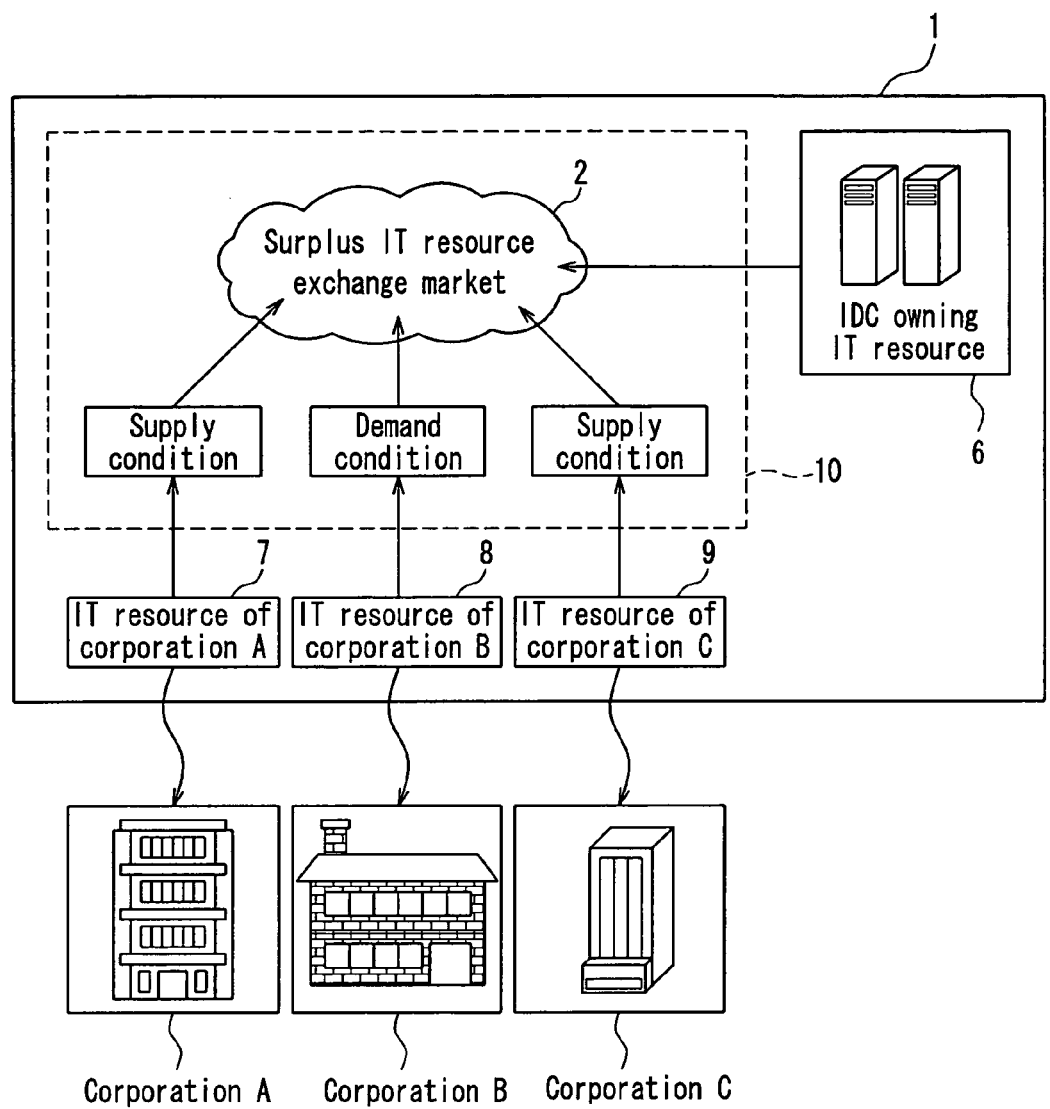
FIG. 1 is a conceptual diagram showing the concept of an entire configuration of an IDC.

An "IT resource" is hardware and/or software constituting a system using a computer. A business system is a computer system constituted by an IT resource.

It is preferable that the surplus determination system according to the present invention further includes a supply condition recording part for recording supply condition data representing a supply condition under which the management system supplies the surplus of the IT resource in any one of the business systems among the plurality of business systems to another business system, and containing at least data representing an amount that can be supplied in the surplus, and a submitting part for outputting the supply condition data recorded in the supply condition recording part to the management system, in a case where the surplus determining part determines that there is a surplus.

The submitting part outputs the supply condition data to the management system in the case where the surplus determining part determines that there is a surplus. Therefore, the management system can supply a surplus of an IT resource that is determined to have a surplus in any one of the business systems to another business system that lacks the IT resource, based on the supply condition represented by the supply condition data. Consequently, a surplus of an IT resource that occurs in a business system can work in another business system. This enables the management system to distribute a surplus of an IT resource in each business system among the business systems.

It is preferable that the surplus determination system according to the present invention further includes an allowable amount data recording part for recording allowable amount data representing a maximum value of a working amount of the IT resource, and a determination data generating part for generating the surplus determination data, based on the allowable amount data recorded in the allowable amount data recording part and the supply condition data recorded in the supply condition recording part.

The surplus determination data generating part generates the surplus determination data from the allowable amount data and the supply condition data. Therefore, if there are the allowable amount data and the supply condition data, a surplus determination rule can be generated automatically. Consequently, for example, an operating entity or the like, which sets the surplus determination rule, does not need to set both the surplus determination rule and the supply condition, which reduces the burden of complicated setting for an operating entity.

The surplus determination data generating part can calculate, for example, a difference between the maximum value of the working amount of an IT resource represented by the allowable amount data and the amount of an IT resource that can be supplied, represented by the supply condition data, and can generate surplus determination data based on the difference.

It is preferable that the surplus determination system according to the present invention further includes an allowable amount data recording part for recording allowable amount data representing a maximum value of a working amount of the IT resource, and a supply condition generating part for generating the supply condition data, based on the allowable amount data recorded in the allowable amount data recording part and the surplus determination data recorded in the surplus determination data recording part.

The supply condition generating part generates the supply condition data from the allowable amount data and the surplus determination data. Therefore, if there are the allowable amount data and the surplus determination data, a supply condition rule can be generated automatically. Consequently, for example, an operating entity of a business system or the like, which sets the supply condition, does not need to set both the surplus determination rule and the supply condition, which reduces the burden of complicated setting for an operating entity.

The supply condition generating part can calculate, for example, a difference between the maximum value of the working amount of an IT resource represented by the allowable amount data and the working amount represented by the working situation that is a requirement in the surplus determination rule, and can generate supply condition data based on the difference.

It is preferable that the surplus determination system according to the present invention further includes a constraint condition recording part for recording at least either one of unit data representing a unit of the IT resource supplied by the management system and margin data representing an amount of the IT resource to be kept in each of the plurality of business systems, wherein the supply condition generating part generates the supply condition data, using at least one of the margin data and the unit data recorded in the constraint condition recording part as a constraint condition.

The supply condition generating part generate a supply condition that can provide a margin to an IT resource, by using margin data as a constraint condition at a time of generating data.

Furthermore, the supply condition generating part can generate a supply condition considering a unit of an IT resource when the IT resource is controlled by the management system, by using unit data as a constraint condition at a time of generating data.

It is preferable that the surplus determination system according to the present invention further includes a constraint condition recording part for recording at least either one of unit data representing a unit of the IT resource supplied by the management system and margin data representing an amount of the IT resource to be kept in each of the plurality of business systems, wherein the determination data generating part generates the surplus determination data, using either one of the margin data and the unit data recorded in the constraint condition recording part as a constraint condition.

The determination data generating part can generate a surplus determination rule that can provide a margin to an IT resource, by using margin data as a constraint condition at a time of generating data.

Furthermore, the determination data generating part can generate a surplus determination rule considering a unit of an IT resource when the IT resource is controlled by the management system, by using unit data as a constraint condition at a time of generating data.

It is preferable that the surplus determination system according to the present invention includes a partial data recording part for recording partial data representing a partial requirement partially satisfying the requirement of the working situation represented by the surplus determination rule, wherein the surplus determining part reads the working data recorded in the working data recording part, the surplus determination data recorded in the surplus determination data recording part, and the partial data recorded in the partial data recording part, and determines a presence/absence of a possibility of occurrence of a surplus, based on whether or not the working situation represented by the working data satisfies the partial requirement represented by the partial data in the requirement of the working situation represented by the surplus determination rule, and the submitting part outputs the supply condition data recorded in the supply condition recording part to the management system as a predicted supply condition, in a case where the surplus determining part determines that there is a possibility of occurrence of a surplus.

The surplus determining part can obtain information representing the working situation in a state where the requirement of the surplus determination rule is satisfied partially before being satisfied completely, by using the partial requirement represented by the partial data. Therefore, the possibility of the occurrence of a surplus can be determined. The submitting part outputs the supply condition of an IT resource that may be supplied as a predicted supply condition, so that the supply condition is submitted to the management system early. Consequently, in the management system, the needs of a business system that requires to demand an IT resource can be aroused early. In addition, the IT resources managed by the management system can be utilized efficiently.

It is preferable that the surplus determination program recorded on the recording medium according to the present invention further allows a computer to execute supply condition recording processing of recording supply condition data representing a supply condition under which the management system supplies the surplus of the IT resource in any one of the business systems among the plurality of business systems to another business system, and containing at least data representing an amount that can be supplied in the surplus, in a supply condition recording part; and submitting processing of outputting the supply condition data recorded in the supply condition recording part to the management system, in a case where it is determined that there is a surplus in the surplus determining processing.

Hereinafter, one embodiment of the present invention will be described in detail with reference to the drawings.

Embodiment 1

Embodiment 1 is directed to an IDC of a utility system having a mechanism for distributing a surplus IT resource among business systems.

FIG. 1 is a conceptual diagram showing the concept of an entire configuration of an EDC 1 in the present embodiment.

The IDC 1 manages IT resources 7, 8, 9 of corporations A, B, C that are operating entities. The corporations A, B, C operate business systems constituted by the IT resources 7, 8, 9, respectively. The IDC 1 includes an IT resource management system 10 for distributing IT resources among different business systems. The IT resources 7, 8, 9 are respectively controlled by the IT resource management system 10 in accordance with requests from the corporations 7, 8, 9. For example, the IT resource management system 10 increases/decreases the IT resource 7 in accordance with a request (i.e., on demand) from the corporation A. An exemplary operation conducted in the IT resource management system 10 will be described below.

For example, supply conditions of the IT resources 7, 9 are presented from the corporations A, C. The corporations A, C present the supply conditions (e.g., a CPU use ratio, the number of bytes used by a storage, a usable period, possible processing conditions (on-line/batch processing), etc.) for supplying surpluses of the IT resources 7, 9, to the IDC 1.

The corporation B presents a demand condition of the IT resource 8. The corporation B presents the demand condition (e.g., a CPU use ratio, the number of bytes used by a storage, a usable period, possible processing conditions (on-line/batch processing), etc.) of an insufficient IT resource, to the IDC 1.

In a surplus IT resource exchange market 2, a supply condition is matched with a demand condition to be fit therefor. For example, in the case where the supply condition of the corporation A is matched with the demand condition of the corporation B, the surplus of the IT resource 7 of the corporation A is supplied to the IT resource 8 of the corporation B.

The difference in the supply/demand between the corporations is compensated by the IDC 1. As a result of the matching processing of the surplus IT resource, in the case where the supply condition is insufficient for the demand condition, the shortage is compensated using an IDC owning IT resource 6. On the contrary, in the case where the supply condition is too large for the demand condition, and the surplus IT resource becomes an oversupply, the IDC 1 purchases the IT resource appropriately.

Figure 2:
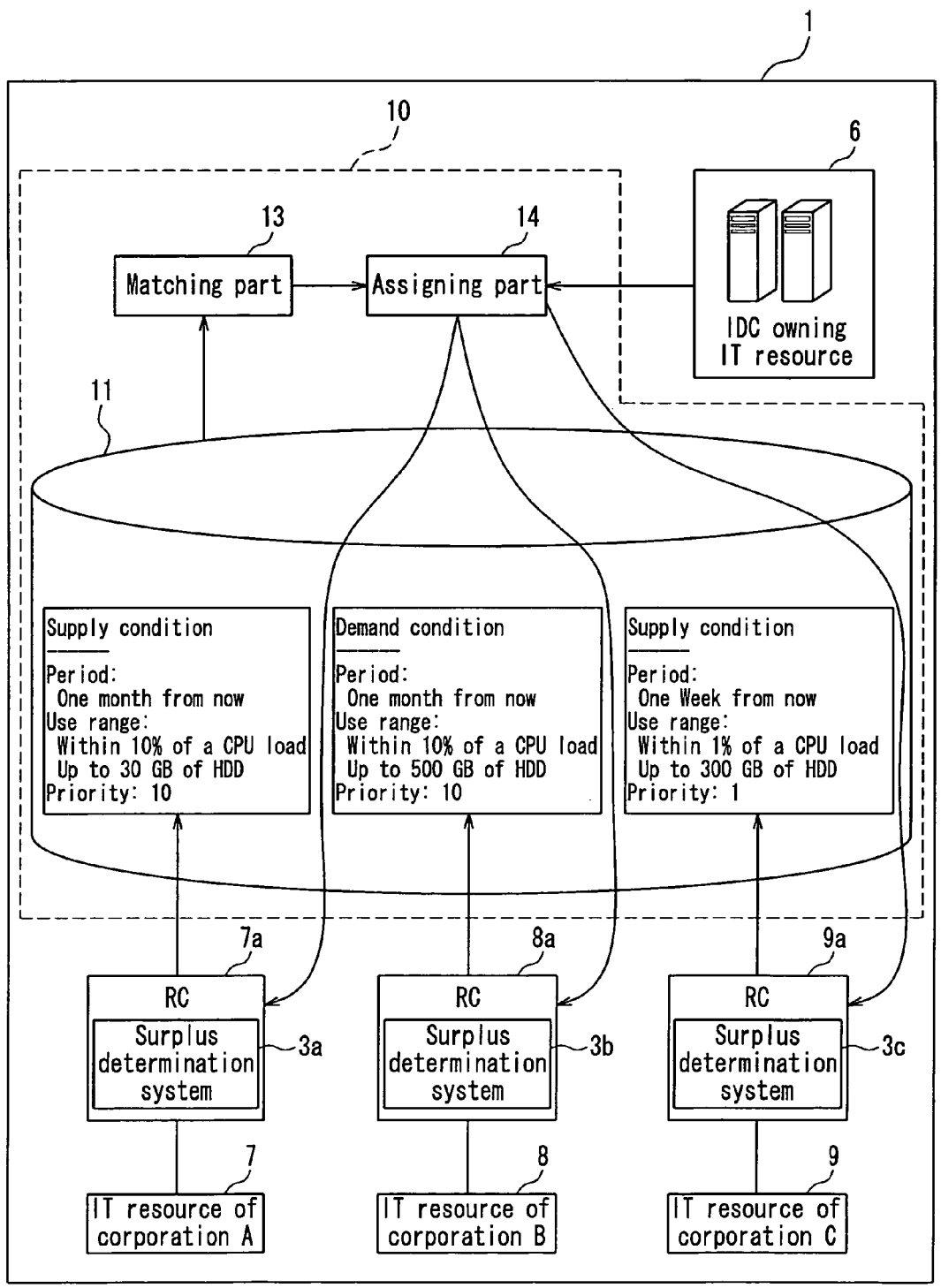
FIG. 2 is a functional block diagram showing an internal configuration of the IDC.

Next, the detailed configuration of the IDC 1 will be described. FIG. 2 is a functional block diagram showing an internal configuration of the IDC 1.

The IT resource management system 10 includes an accumulating part 11, a matching part 13, and an assigning part 14. The accumulating part 11 accumulates supply conditions and demand conditions. The matching part 13 extracts suitable conditions from the supply conditions and demand conditions accumulated in the accumulating part 11. The assigning part 14 assigns the IT resources 7, 8, 9 of the corporations A, B, C in accordance with the conditions extracted by the matching part 13. The assigning part 14 transmits information for increasing/decreasing the respective IT resources 7, 8, 9 to resource coordinators (hereinafter, referred to as RCs) 7a, 8a, 9a, for example. Furthermore, in the case where the conditions extracted by the matching part 13 are insufficient, the assigning part 14 compensates for the shortage using the IDC owning IT resource 6.

In the IT resources 7, 8, 9 of the corporations A, B, C, the RCs 7a, 8a, 9a are deployed. The RCs 7a, 8a, 9a increase/decrease the IT resources 7, 8, 9 in accordance with the information from the assigning part 14.

Furthermore, the RCs 7a, 8a, 9a include surplus determination systems 3a, 3b, 3c. The surplus determination systems 3a, 3b, 3c receive supply conditions of surplus IT resources and demand conditions of insufficient IT resources from the corporations A, B, C, and store them. The surplus determination systems 3a, 3b, 3c monitor the IT resources 7, 8, 9 to determine if there is a surplus. In the case where there is a surplus, a supply condition is output to the IT resource management system 10. The detail of the surplus determination systems 3a, 3b, 3c will be described later.

The IT resource management system 10 and the surplus determination systems 3a, 3b, 3c can be configured, for example, on a computer of a server or the like. The functions of the matching part 13 and the assigning part 14 can be realized when a CPU of a computer executes a predetermined program. As the accumulating part 11, a portable recording medium such as a flexible disk or a memory card, a recording medium in a recording apparatus on a network, or the like, as well as a recording medium such as a hard disk or a RAM stored in a computer can be used. The IT resource management system 10 and the surplus determination systems 3a, 3b, 3c can be composed of one server, or can be configured in such a manner that the function is distributed in a plurality of servers.

Figure 3:
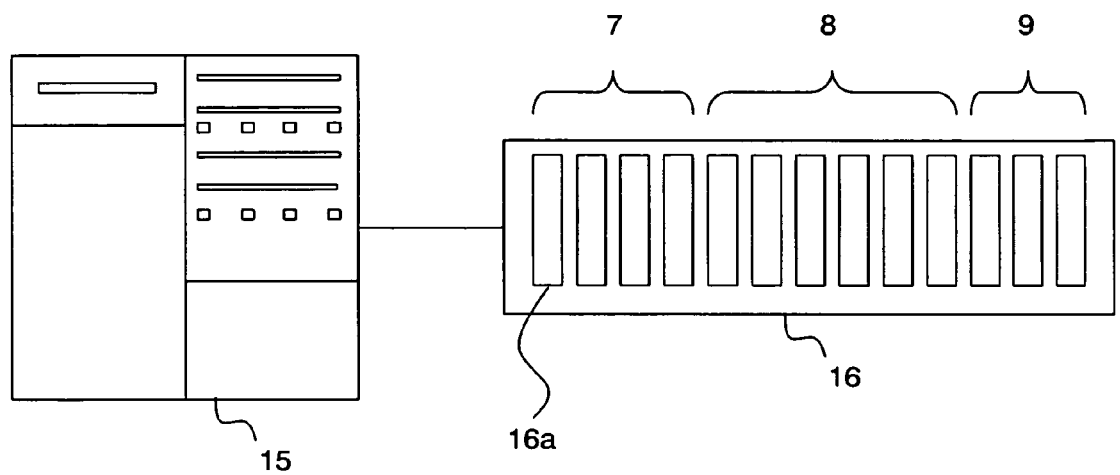
FIG. 3 shows exemplary physical configurations of an IT resource management system and IT resources.

FIG. 3 shows exemplary physical configurations of the IT resource management system 10 and the IT resources 7, 8, 9. As shown in FIG. 3, the IT resource management system 10 and the IT resources 7, 8, 9 are composed of, for example, a blade server 16 including a plurality of server blades 16a, and a deployment server 15 managing the blade server 16. The blade server 16 and the deployment server 15 are connected to each other, for example, through a LAN or the like.

The IT resource management system 10 can be configured on the deployment server 15. The plurality of server blades 16a in one blade server 16 are assigned to the IT resource 7 of the corporation A, the IT resource 8 of the corporation B, and the IT resource 9 of the corporation C. The RCs 7a, 8a, 9a can be operated on the deployment server 15. The IT resources 7, 8, 9 can also be composed of blade servers that are physically independent from each other.

Figure 4:
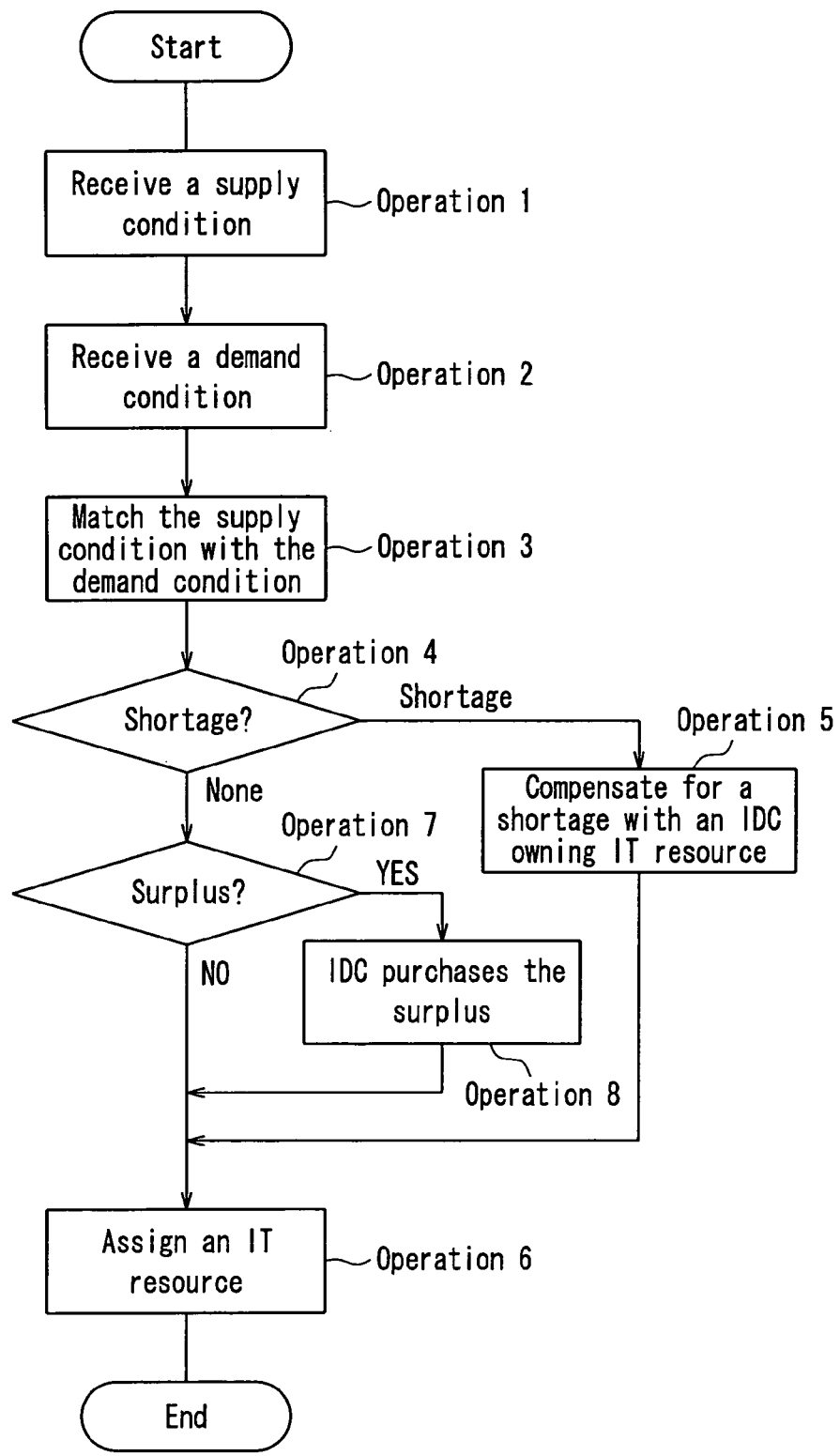
FIG. 4 is a flow chart illustrating an operation of surplus IT resource management processing by the IT resource management system.

Next, the operation of processing for the IT resource management system 10 to distribute a surplus IT resource will be described with reference to FIG. 4. FIG. 4 is a flow chart illustrating an exemplary flow of surplus IT resource management processing by the IT resource management system 10.

The summary of the processing will be described with reference to FIG. 4. First, the IT resource management system 10 receives supply conditions (Operation 1). Generally, a plurality of supply conditions are presented from a plurality of corporations. The IT resource management system 10 receives data representing the supply conditions sent from the corporations and stores them in the accumulating part 11.

For example, in the case where there is a surplus 7b in the IT resource 7 of the corporation A, the surplus determination system 3a on the RC 7a automatically detects the surplus 7b. Upon detecting the surplus 7b, the surplus determination system 3a outputs the previously registered supply condition to the IT resource management system 10. The IT resource management system 10 receives the supply condition and accumulates it in the accumulating part 11. A detailed example of the processing of the surplus determination system 3a will be described later.

Next, the IT resource management system 10 receives demand conditions (Operation 2). Generally, a plurality of demand conditions are presented. The IT resource management system 10 receives data representing the demand conditions sent from corporations and stores them in the accumulating part 11.

For example, in the case where there is a shortage in the IT resource 8 of the corporation B, the RC 8a of the corporation B automatically detects the shortage of the IT resource 8. The RC 8a outputs the previously registered demand condition to the IT resource management system 10. The IT resource management system 10 receives the output demand condition and accumulates it in the accumulating part 11.

The matching part 13 matches the supply condition and the demand condition stored in the accumulating part 11 with each other (Operation 3). Exemplary data configurations of the supply condition and the demand condition will be described later.

The assigning part 14 determines whether or not there is a shortage with respect to the demand condition, in the supply condition extracted as a result of the matching (Operation 4).

In the case where the extracted supply condition is insufficient for the demand condition, the assigning part 14 compensates for the shortage using the IDC owning IT resource 6 (Operation 5).

For example, in the case where the supply condition is "400 GB of a hard disk capacity can be supplied" while the demand condition is "500 GB of a hard disk capacity is required", the shortage is 100 GB. The assigning part 14 allows a demanding corporation to use 100 GB of a hard disk of the IDC owning IT resource 6.

In the case of no shortage, the assigning part 14 determines whether or not there is a surplus with respect to the demand condition, in the supply condition extracted as a result of the matching (Operation 7).

In the case where there is a surplus with respect to the demand condition in the extracted supply condition, the assigning part 14 performs processing of allowing the IDC to purchase the surplus and to add it to the IDC owning IT resource 6 (Operation 8).

In the case of no surplus, the assigning part 14 assigns an IT resource (Operation 6). More specifically, the assigning part 14 assigns an IT resource presented by the supply condition extracted as a result of the matching to a corporation that demands an IT resource under the demand condition extracted as a result of the matching, in such a manner that the corporation can use the IT resource.

Figure 5:
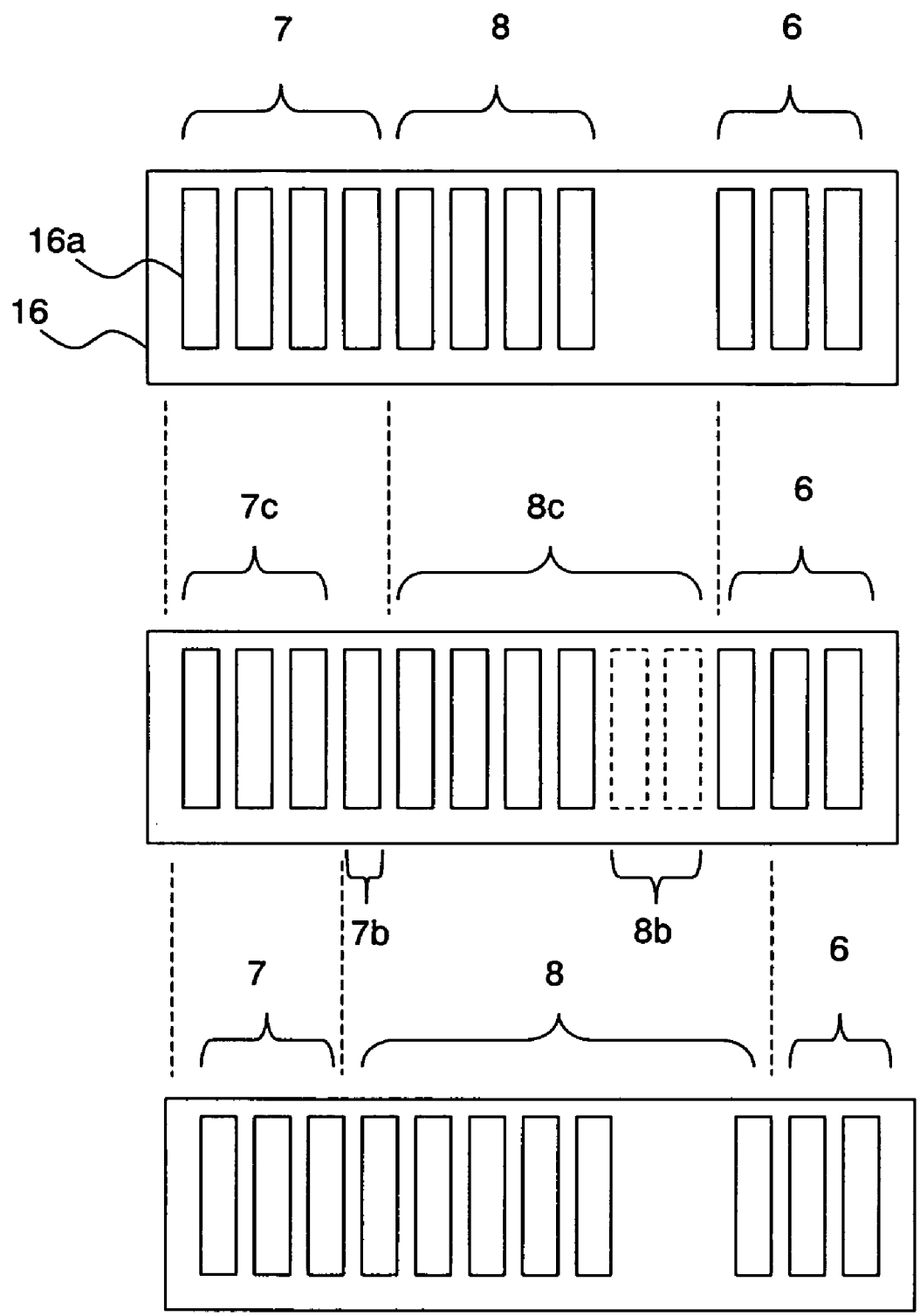
FIG. 5 shows an exemplary virtual configuration of a blade server in the case where a surplus of an IT resource is assigned to another IT resource.

As an example, the processing of the assigning part 14 in the case where the content of the extracted supply condition is to supply a surplus of the IT resource 7, and the content of the demand condition matching the supply condition is to compensate for a shortage in the IT resource 8 will be described. FIG. 5 shows an exemplary virtual configuration of a blade server in the case where the surplus of the IT resource 7 is assigned to the IT resource 8.

As shown in an upper stage of FIG. 5, the blade server 16 includes 11 server blades 16a. Among the 11 server blades 16a, 4 server blades 16a are assigned to the IT resource 7, 4 server blades 16a are assigned to the IT resource 8 of the corporation B, and the remaining 3 server blades 16a are assigned to the IDC owning IT resource 6.

An intermediate stage of FIG. 5 shows an IT resource 7c required by the corporation A at a certain time, and an IT resource 8c required by the corporation B at that time. The IT resource 7c required by the corporation A is 3 server blades 16a, so that one server blade becomes the surplus 7b. On the other hand, the IT resource 8c required by the corporation B is 6 server blades 16a, so that 2 server blades 16a become a shortage 8b.

Herein, the case will be described where the supply condition output from the RC 7a of the corporation A so as to supply the surplus 7b and the demand condition output from the RC 8a of the corporation B so as to compensate for the shortage 8b are extracted in the matching part 13. The assigning part 14 notifies the RC 7a of the corporation A that the server blade 16a of the surplus 7b is used in the business system of the corporation B. The RC 7a changes the logical setting of the server blade 16a so that the server blade 16a corresponding to the surplus 7b works as the IT resource 8 of the business system of the corporation B.

Furthermore, the assigning part 14 requests the RC 8a of the corporation B to assign the server blade 16a of the surplus 7b of the corporation A to the IT resource 8 to compensate for the shortage 8b. The RC 8a changes the logical setting of the server blade 16a so that the surplus 7b works as the IT resource 8 in the business system of the corporation B. In this case, merely by assigning the surplus 7b to the IT resource 8 cannot compensate for the shortage 8b completely. Therefore, the assigning part 14 changes the logical setting of the server blade 16a so that the server blade 16a of the IT resource 6 owned by the IDC works as the IT resource 8 of the corporation B.

Consequently, as shown in a lower stage of FIG. 5, 3 server blades 16a are assigned to the IT resource 7 of the corporation A, and 6 server blades 16a are assigned to the IT resource 8 of the corporation B.

Software used by the corporation B is installed in the server blade 16a assigned to the IT resource 8 of the corporation B, and started. Thus, the corporation B comes to be able to use the surplus 7b of the IT resource 7 of the corporation A.

The operation in which the surplus 7b of the IT resource 7 is assigned to the IT resource 8 of the corporation B may be the one in which the logical configuration in an apparatus is changed as described above, or in which the apparatus such as a server is physically moved.

In the processing shown in FIG. 4, the IT resource management system 10 receives supply conditions at all times (Operation 1), and may perform the processing in Operations 2 to 8 every time the IT resource management system 10 receives one demand condition. Such processing is used for on-line processing. At this time, the processing in Operations 7 and 8 is not necessarily required to be performed at a timing of receiving a demand condition, and batch processing may be performed appropriately.

Furthermore, the following may be performed. The IT resource management system 10 receives supply conditions (Operation 1) and receives demand conditions (Operation 2) at all times, accumulates the supply conditions and the demand conditions, and performs Operations 3 to 8 with batch processing.

Figure 6:
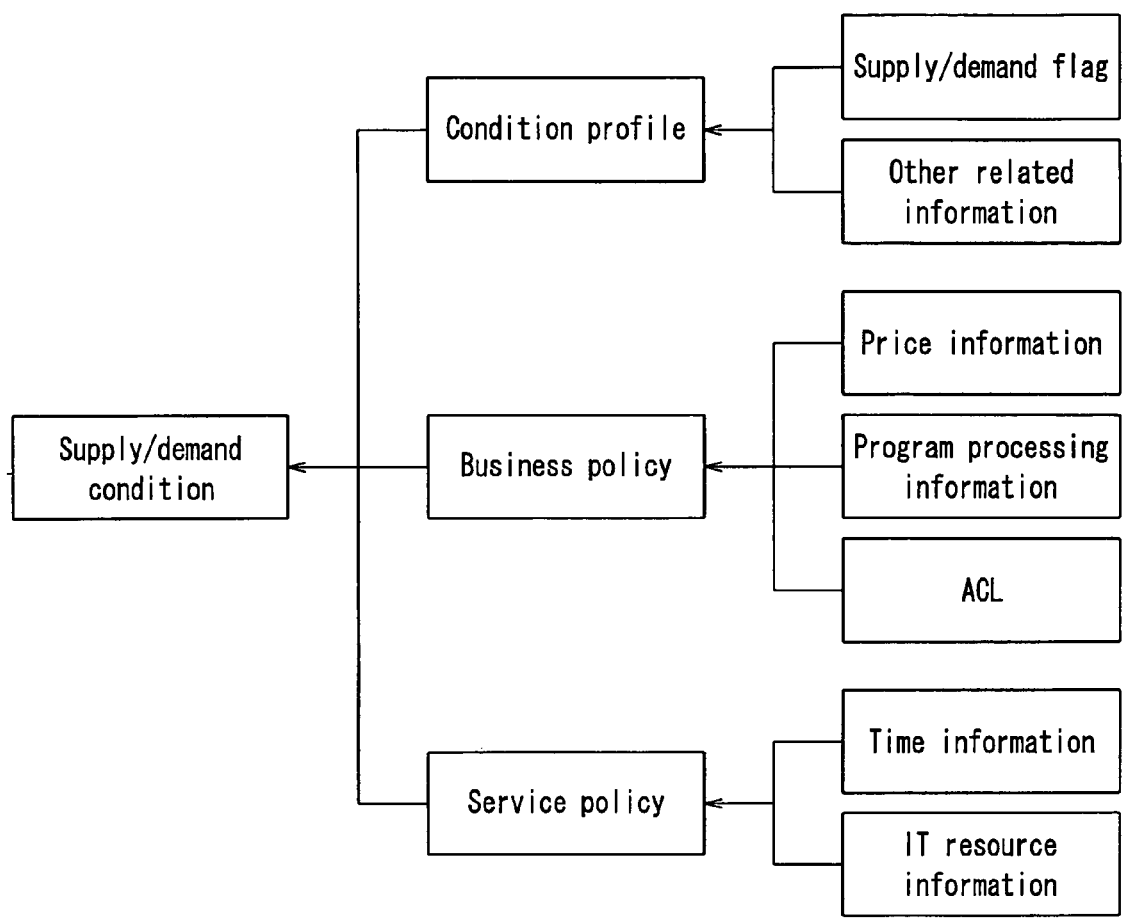
FIG. 6 shows an exemplary schema of information showing a demand condition and a supply condition.

Next, exemplary data configurations of the supply condition and the demand condition will be described. FIG. 6 shows an exemplary schema of information representing the demand condition and the supply condition.

It is preferable that the demand condition and the supply condition can be described with the similar schema so as to facilitate the matching processing. The schema shown in FIG. 6 can be used for both the demand condition and the supply condition.

The demand condition and the supply condition include information such as the amount of IT resources (a CPU use ratio, the number of bytes used by a storage, etc.), a use time band, a usable period, accounting conditions, program processing contents (batch processing, on-line processing, etc.), and business constrains (that can be provided only to a group corporation, etc.). The schema shown in FIG. 6 corresponds to these pieces of organized information.

In the schema shown in FIG. 6, the supply condition/demand condition include a condition profile, a business policy, and a service policy.

The condition profile includes a supply/demand flag, and other related information. Depending upon the supply/demand flag, it is determined whether certain condition data is a supply condition or a demand condition.

The business policy refers to a business requirement of a corporation that is an owner of an IT resource. For example, price information, program processing information, an ACL determining whether or not a corporation is a group corporation, and the like are included in the business policy.

The contents of the price information are, for example, as follows: "a supply price will be charged by ¥__ with respect to a CPU use ratio" or "an IT resource that can be used by ¥__ will be demanded preferentially with respect to a CPU use ratio". Examples of the program processing information include "on-line processing" and "batch processing". Examples of the ACL include "a bank-related corporation is OK as a corporation for a supply destination, but a corporation in the XX business world is rejected" and "an IT resource of a group corporation will be demanded preferentially".

The service policy defines a system performance requirement and/or an operation rule of an IT resource operated by a corporation. For example, use time information, supply time information, IT resource information, and the like are included in the service policy.

An example of the service policy of the supply condition includes "at night, when a CPU use ratio becomes 10% or less, 50% of an IT resource may be supplied for batch processing until 7 a.m.". An example of the service policy of the demand condition includes "at night, if batch processing is unlikely to be finished before 5 a.m., an IT resource will be demanded".

If the business policy and the service policy are described together, a plurality of demand conditions or a plurality of supply conditions having the same business policies can be merged.

In a general IT resource assignment, matching is performed based on the detail of IT resource information inside a service policy. However, actually, unless "business policy" such as "price", "program processing contents", and "ACL" is matched, demand/supply processing cannot be performed. Thus, by performing merging processing with respect to a business policy before performing detailed matching processing of an IT resource, a division loss and a surplus resource can be reduced, and an efficient assignment can be performed.

Figure 7:
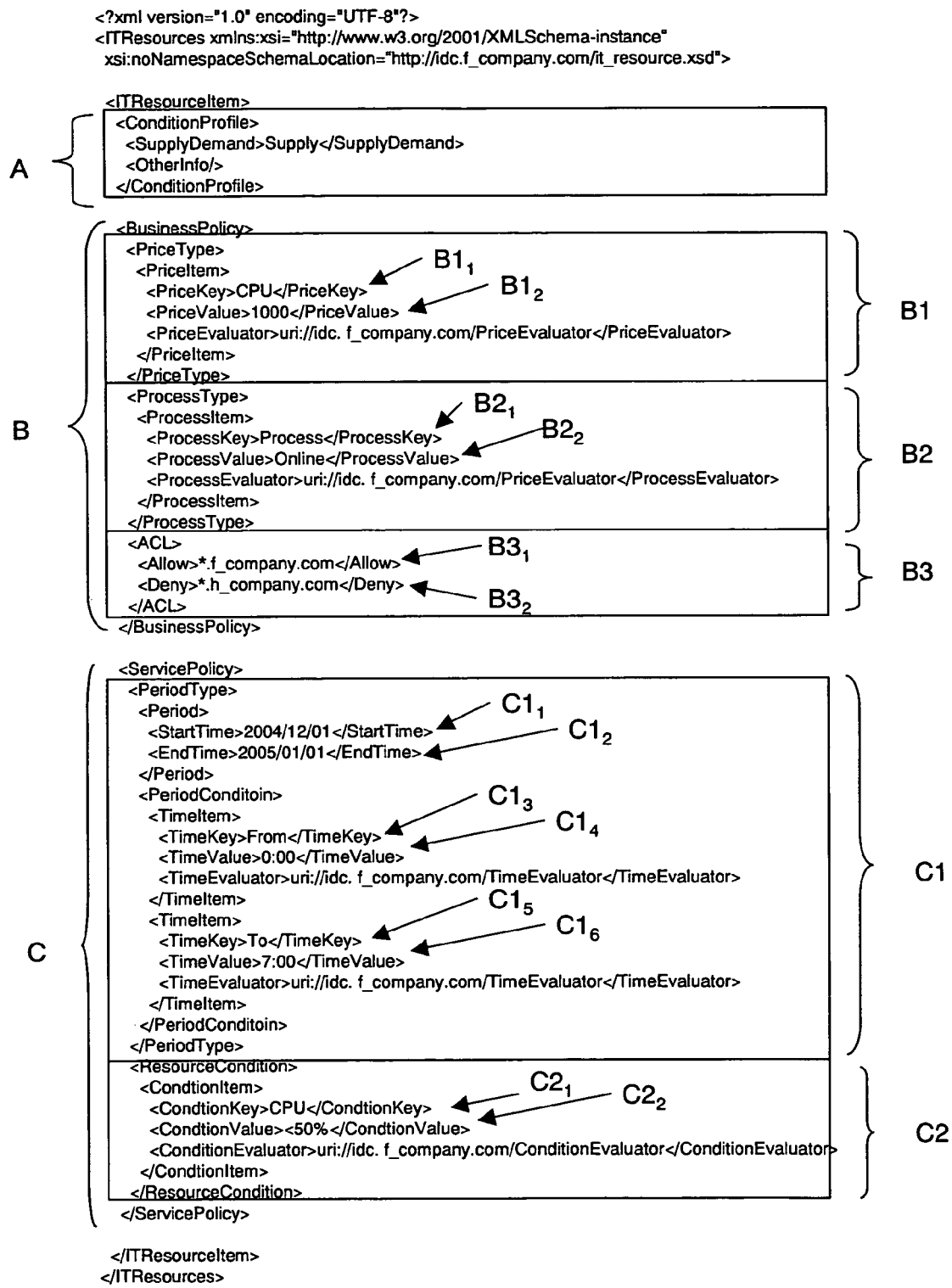
FIG. 7 is a view showing an example of specific data representing a supply condition.

FIG. 7 shows an example of specific data representing a supply condition described with the schema shown in FIG. 6. The supply condition shown in FIG. 7 is described in an XML format, for example.

In FIG. 7, a condition profile is described in a portion represented by A, a business policy is described in a portion represented by B, and a service policy is described in a portion represented by C.

More specifically, in the portion represented by A, a supply is shown with a <SupplyDemand> tag describing a supply/demand flag.

In the business policy, price information is described in a portion represented by B1. More specifically, <PriceKey> tag B11 shows that the target of a price is a CPU use ratio (CPU). <PriceValue> tag B12 shows that the price is ¥1,000 (1000).

In the portion represented by B2, program processing information is described. More specifically, <ProcessValue> tag B22 shows that a process represented by <ProcessKey> tag B21 is on-line processing (OnLine).

In the portion represented by B3, ACL is described. More specifically, <Allow> tag B31 shows that a corporation that is capable of supplying is "f_company.com". <Deny> tag B32 shows that a corporation that is not capable of supplying is "h_company.com".

In the service policy, time information is described in a portion represented by C1. More specifically, <StartTime> tag $C1_1$ shows that the start of a supply possible period is Jan. 12, 2004, and <EndTime> tag $C1_2$ shows that the end of a supply possible period is Jan. 1, 2005. Furthermore, <TimeValue> tag $C1_4$ shows that a start time (From) of a supply possible period represented by <TimeKey> tag $C1_3$ is 0:00. Similarly, <TimeValue> tag $C1_6$ shows that an end time (To) of a supply possible period represented by <TimeKey> tag $C1_5$ is 7:00.

In a portion represented by C2, IT resource information is described. More specifically, <ConditionValue> tag $C2_2$ shows that a performance index (CPU use ratio) of an IT resource represented by a <ConditionKey> tag $C2_1$ is 50%.

(Surplus Determination System)

Next, the surplus determination system 3a will be described. The description of the surplus determination systems 3b, 3c is the same as that of the surplus determination system 3a, and hence will be omitted here.

Figure 8:
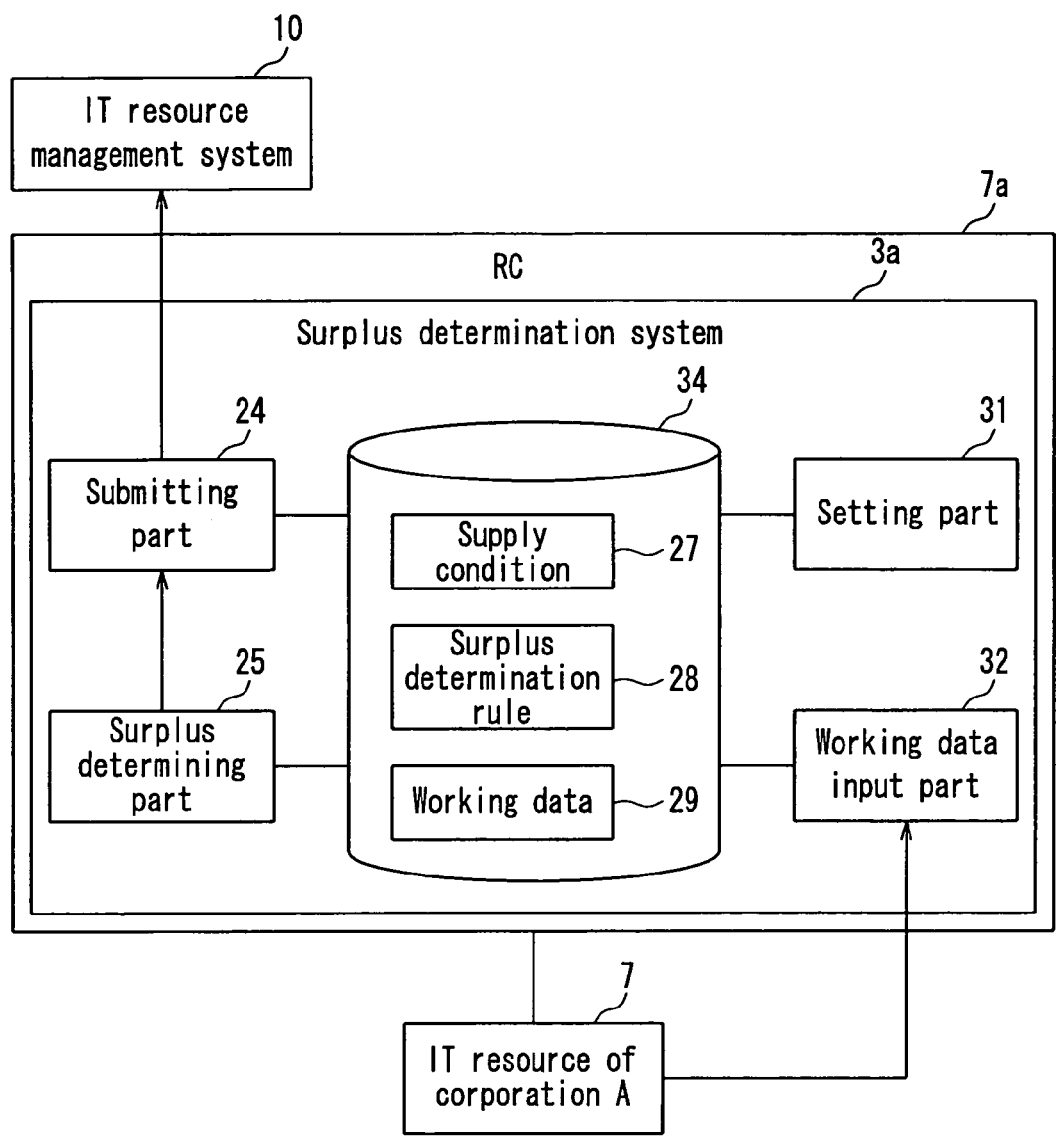
FIG. 8 is a functional block diagram showing a configuration of a surplus determination system.

FIG. 8 is a functional block diagram showing a configuration of the surplus determination system 3a. The surplus determination system 3a includes a submitting part 24, a surplus determining part 25, a setting part 31, a working data input part 32, and a recording part 34.

The setting part 31 receives inputs of a supply condition 27 and a surplus determination rule 28, for example, from the corporation A that is an operating entity, and records them in the recording part 34. The surplus determination rule 28 is data containing at least information representing a requirement of a working situation for the IT resource 7 to be determined to have a surplus. An example of the data of the surplus determination rule 28 will be described later. Furthermore, the surplus determination rule 28 may be linked to the corresponding supply condition 27 so as to refer it.

The working data input part 32 inputs working data 29 representing the working situation of the IT resource 7 and records it in the recording part 34. The working data 29 contains data representing a transition of a working situation of hardware or software constituting the IT resource 7. Examples of the working data 29 include a CPU use ratio, the number of transactions, the transition of a use capacity of a hard disk, a network line capacity, and the like during a predetermined period. The predetermined period can be set to be, for example, a period from a time before by a predetermined period (e.g., 48 hours) of a current time to the current time.

The working data 29 is generated as log data, for example, by a business system constituted by the IT resource 7. Data representing a working situation during a period in which the business system is operated by the corporation A can be set to be the working data 29. Because of this, regarding an IT resource in the course of working after the corporation A starts the operation of the business system, the presence/absence of a surplus can be determined.

The surplus determining part 25 determines whether of not there is a surplus in the IT resource 7 based on the working data 29 and the surplus determination rule 28. The surplus determining part 25 determines that there is a surplus in the case where the working situation represented by the working data 29 satisfies the requirement of the working situation represented by the surplus determination rule 28. In the case where the surplus determining part 25 determines that there is a surplus, the submitting part 24 outputs the supply condition 27 recorded in the recording part 34 to the IT resource management system 10.

Figure 9:
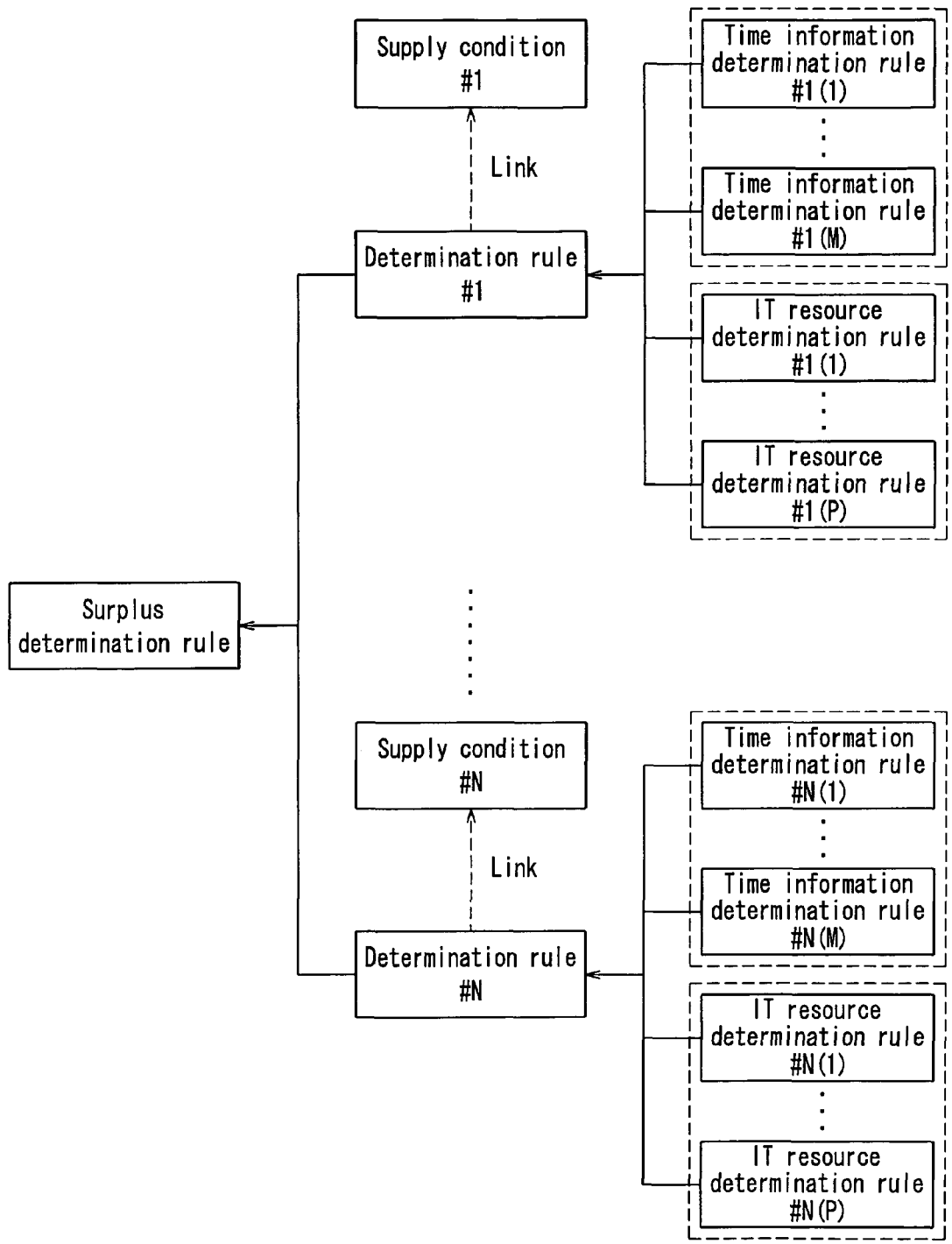
FIG. 9 shows an exemplary schema of data contained in a surplus determination rule.

Hereinafter, the surplus determination rule 28 will be described. FIG. 9 shows an exemplary schema of data contained in the surplus determination rule 28.

In the example shown in FIG. 9, the surplus determination rule 28 has a hierarchical structure. At level right below an uppermost level (surplus determination rule), a plurality of determination rules #1 to #N are included (N is an integer of 2 or more). The determination rules #1 to #N are linked to the corresponding supply conditions #1 to #N. Because of this, for example, in the case where the surplus determining part 25 determines that there is a surplus based on the determination rule #1, the submitting part 24 can output the supply condition #1 linked to the determination rule #1 to the IT resource management system 10.

In lower levels of the respective determination rules #1 to #N, time information determination rules #1(1) to #N(M) and IT resource determination rules #1(1) to #N(P) are included (M, P are integers of 2 or more). For example, in a lower level of the determination rule #1, M time information determination rules #1(1) to #1(M) and P IT resource determination rules #1(1) to #1(P) are present.

The time information determination rule is a determination rule regarding time information. The time information determination rule contains, for example, information representing a period targeted for determination by the surplus determining part 25. More specifically, the surplus determining part 25 determines the working situation during a period determined by the time information determination rule in the period during which the IT resource 7 is working.

The IT resource determination rule is, for example, information representing the working situation for determining the IT resource 7 to have a surplus. The IT resource determination rule contains, for example, information for specifying the kind of the IT resource 7 to be determined and the degree of a working situation. Examples of the kind of the IT resource 7 to be determined include a CPU, a hard disk, and a transaction performed by a server. The information representing the degree of the working situation includes, for example, data representing a CPU use ratio, a use capacity of a hard disk, and the number of transactions processed by a server.

FIG. 10 shows a specific example of data of a surplus determination rule described with the schema shown in FIG. 9. The surplus determination rule 28 shown in FIG. 10 is described in an XML form, as an example. In FIG. 10, in a portion represented by D, a link to a supply condition in a <RefITResourceItem> tag is described.

In portions represented by E1, E2, i.e., <TimeItem> tags in a lower level of a <PeriodCondition> tag in a lower level of a <PeriodType> tag, for example, time information determination rules #1(1), #1(2) are described. The time information determination rule #1(1) represented by E1 describes that the working situation of "0:00 to 7:00" is to be determined. The time information determination rule #1(2) represented by E2 describes a condition that the working situation of "weekdays other than weekends" is to be determined.

A portion represented by F, i.e., a <ResourceItem> tag in a lower level of a <ResourceType> tag describes an IT resource determination rule #1(1), for example. The IT resource determination rule #1(1) describes a condition: it is determined that there is a surplus in the case where "a CPU use ratio is less than 30%".

Thus, the condition represented by the determination rule #1 is a condition: it is determined that there is a surplus in the case where "a CPU use ratio is less than 30%" in "0:00 to 7:00" in "weekdays other than weekends".

Figure 11:
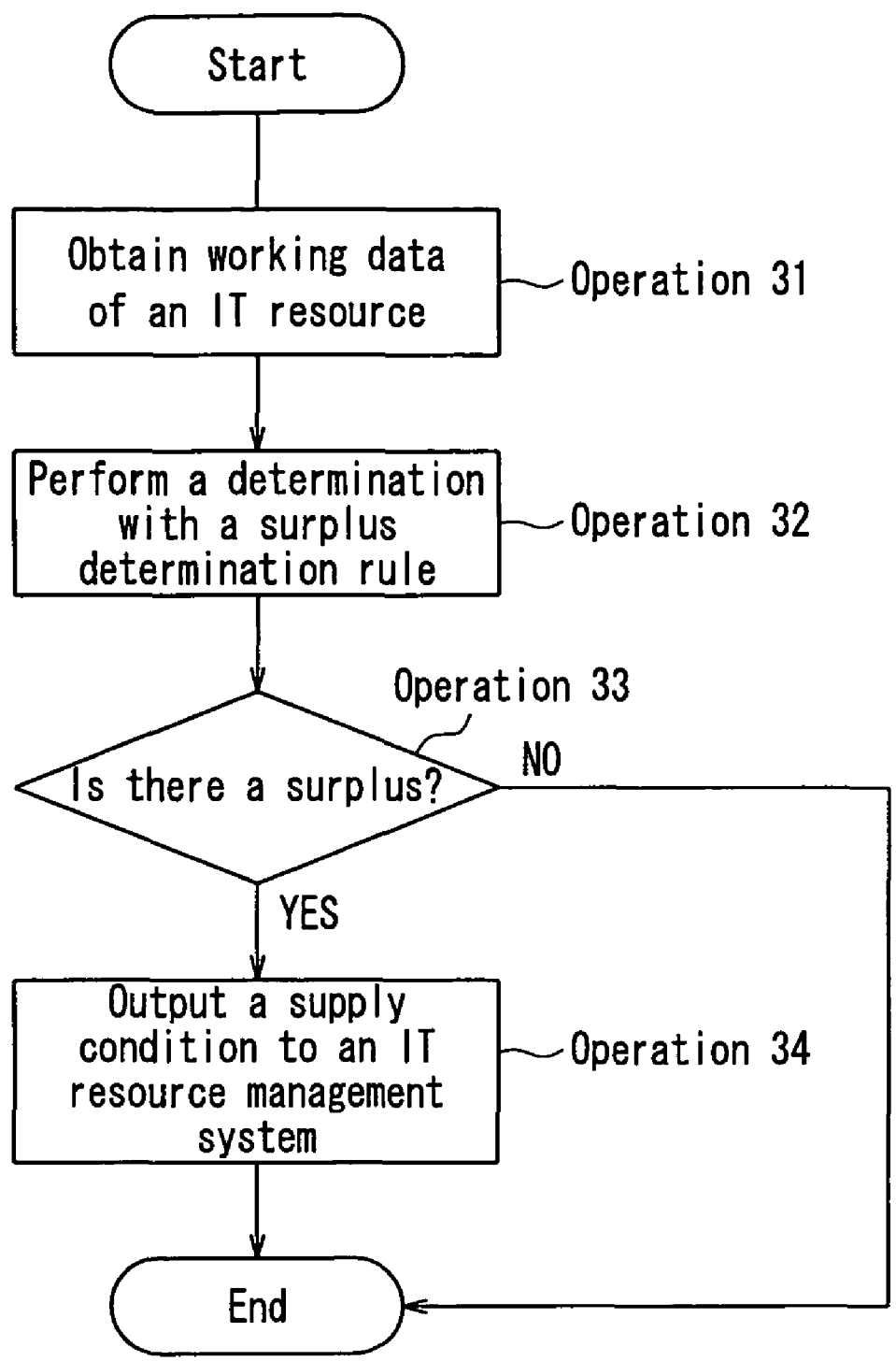
FIG. 11 is a flow chart illustrating a flow of surplus determination processing performed by the surplus determination system.

Next, the operation in which the surplus determination system 3a determines whether or not there is a surplus in the IT resource 7 will be described. FIG. 11 is a flow chart illustrating a flow of surplus determination processing performed by the surplus determination system 3a.

First, the working data input part 32 inputs the working data 29 of the IT resource 7 and saves it in the recording part 34 (Operation 31). The working data 29 is, for example, data representing the transition of a CPU use ratio of a server included in the IT resource 7 from a time 48 hours before to a current time.

Next, the surplus determining part 25 compares the surplus determination rule 28 recorded in the recording part 34 with the working data 29 to determine whether or not there is a surplus in the IT resource 7 (Operation 32). For example, it is assumed that the determination rule #1 contained in the surplus determination rule 28 describes a condition: it is determined that there is a surplus in the case where "a CPU use ratio decreases by 20% over 48 hours". In this case, the surplus determining part 25 determines that there is a surplus when the transition of a CPU use ratio represented by the working data 29 shows a 20% decrease over 48 hours.

In the case where the surplus determining part 25 determines that there is a surplus (YES in Operation 33), the submitting part 24 reads the supply condition #1 liked to the determination rule #1 from the supply condition 27 in the recording part 34, and outputs it to the IT resource management system 10 (Operation 34). The service policy of the supply condition 27 to be output describes, for example, a condition that "10% of a CPU ability is supplied for 100 hours".

The surplus determination system 3a periodically repeats the processing in Operations 31 to 34. Because of this, every time the surplus determining part 25 determines that there is a surplus, the corresponding supply condition 27 is output to the IT resource management system 10. Thus, by using the surplus determination rule 28 and the supply condition 27, a surplus IT resource can be released to the IT resource management system 10 in quick response to the occurrence of a surplus in the IT resource 7.

Figure 12:
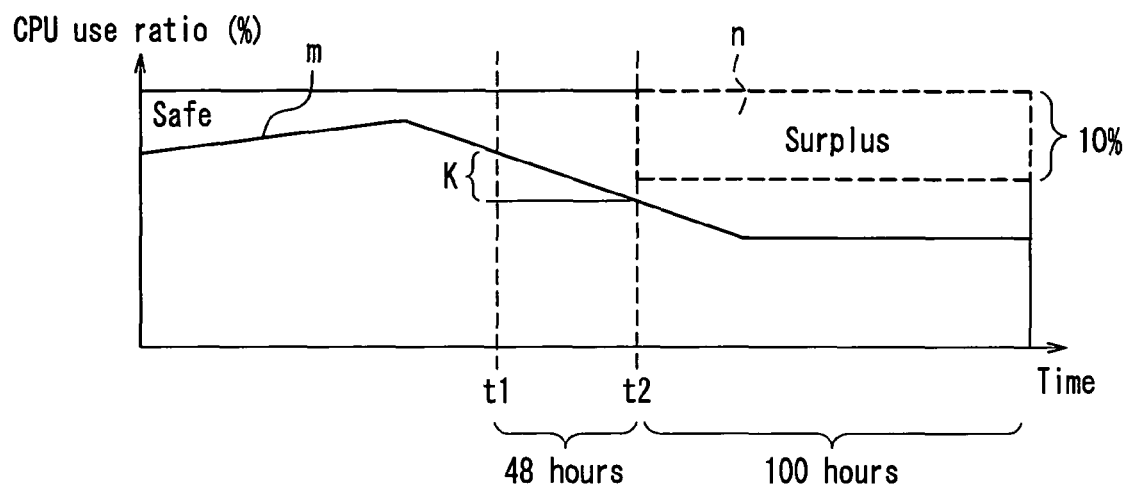
FIG. 12 is a graph showing the transition of a CPU use ratio.

FIG. 12 is a graph showing the transition of a CPU use ratio. A vertical axis represents a CPU use ratio, and a horizontal axis represents a time. A line m represents the transition of a CPU use ratio. An example of the above-mentioned surplus determination processing will be described with reference to the graph shown in FIG. 12. A time t2 represents a surplus determination time, and a time t1 represents a time 48 hours before the surplus determination time. At the surplus determination time t2, the working data input part 32 inputs working data. The working data 29 input at this time needs to represent the transition of a CPU use ratio at least during a period from the time t1 to the time t2. The determination rule #1 describes a condition: it is determined that there is a surplus in the case where "a CPU use ratio decreases by 20% over 48 hours". Therefore, in the case where a difference k between the CPU use ratio at the time t1 and the CPU use ratio at the time t2 is 20% or more, the surplus determining part 25 determines that there is a surplus.

The submitting part 24 receives the determination by the surplus determining part 25 and outputs a supply condition describing "10% of a CPU ability can be supplied for 100 hours" to the IT resource management system 10. Therefore, a portion surrounded by a dotted line n in the graph can be supplied as a surplus IT resource. More specifically, 10% of a CPU ability can be supplied as a surplus IT resource for 100 hours from the time t2.

Embodiment 2

In Embodiment 1, the submitting part 24 outputs the supply condition 27 to the IT resource management system 10 in the case where the surplus determining part 25 determines that there is a surplus. In Embodiment 2, the submitting part 24 outputs the supply condition 27 to the IT resource management system 10 even in the case where the surplus determining part 25 determines that there is a possibility of the occurrence of a surplus before determining that there is a surplus.

Figure 13:
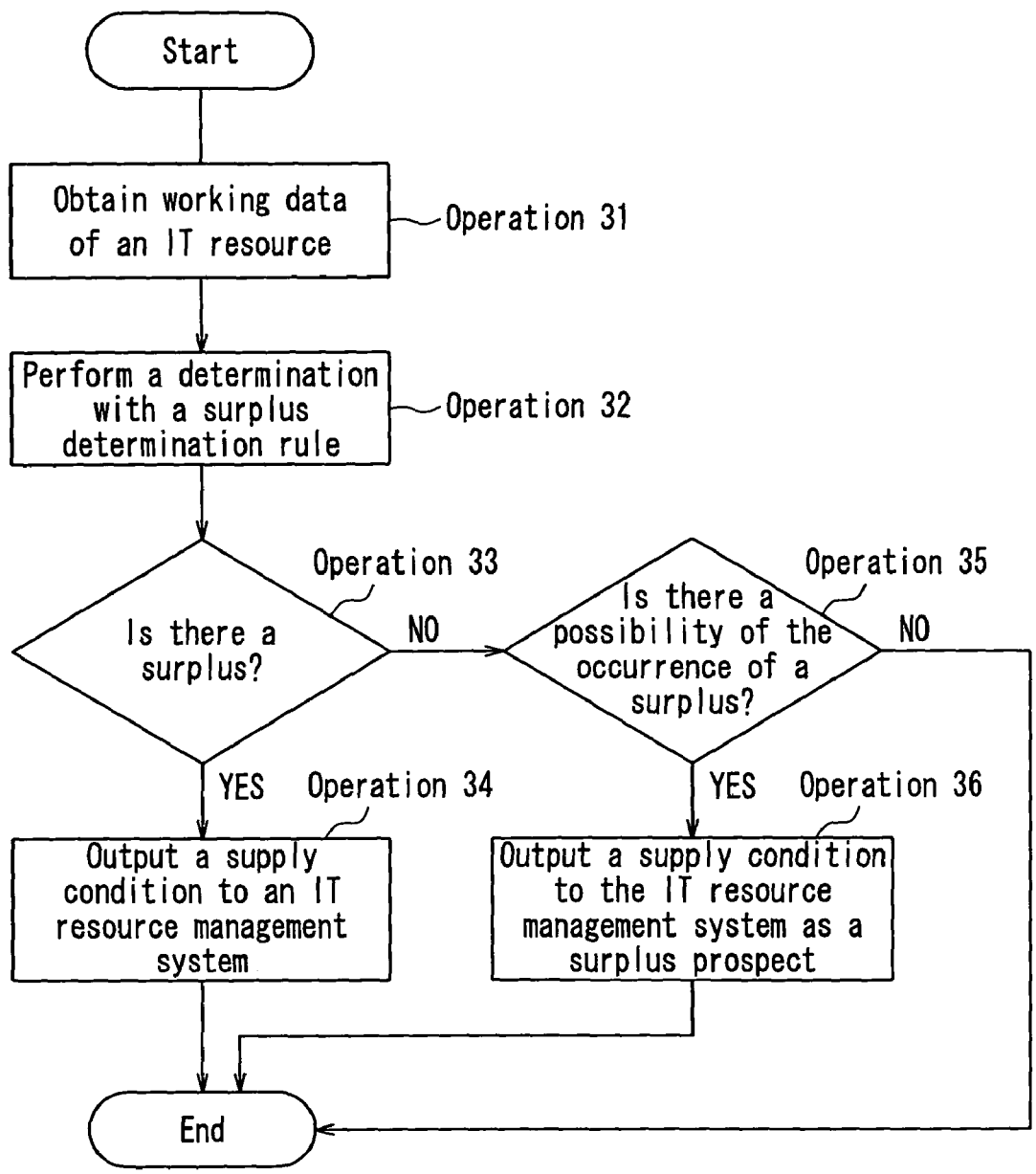
FIG. 13 is a flow chart illustrating a flow of surplus determination processing performed by the surplus determination system in Embodiment 2.

FIG. 13 is a flow chart illustrating a flow of surplus determination processing performed by the surplus determination system in the present embodiment. In the processing shown in FIG. 13, the same operations as those in FIG. 11 are denoted with the same reference numerals as those therein, and the description thereof will be omitted here. Furthermore, the configuration of the surplus determination system in the present embodiment is the same as that of the surplus determination system 3a in Embodiment 1, so that the description thereof will be omitted here.

In the present embodiment, even in the case where the surplus determining part 25 does not determine that there is a surplus (NO in Operation 33), when the surplus determining part 25 determines that there is a possibility of the occurrence of a surplus (YES in Operation 35), the submitting part 24 outputs the supply condition 27 to the IT resource management system 10 as a predicted supply condition. The submitting part 24 may output data in which information is written in the supply condition 27 to the effect that the condition is a predicted supply condition, or may output information to the effect that the supply condition 27 to be output is a predicted supply condition together with the supply condition 27.

Herein, an exemplary method for allowing the surplus determining part 25 to determine whether or not there is a possibility of the occurrence of a surplus will be described. For example, in the case where the working condition represented by the working data 29 allows the requirement of the working condition represented by the surplus determination rule 28 to be established partially, the surplus determining part 25 determines that there is a possibility of the occurrence of a surplus. For example, in the case where a predetermined value representing the working situation is set as a requirement in the surplus determination rule 28, when the working situation represented by the working data 29 reaches a part of the predetermined value, the requirement is established partially. For example, in the case where a condition: it is determined that there is a surplus when "a CPU use ratio decreases by 20% over 48 hours" is set as the surplus determination rule 28, when the CPU use ratio decreases by 10% over 24 hours, the requirement of the surplus determination rule is established partially, so that it may be determined that there is a possibility of the occurrence of a surplus.

Figure 14:
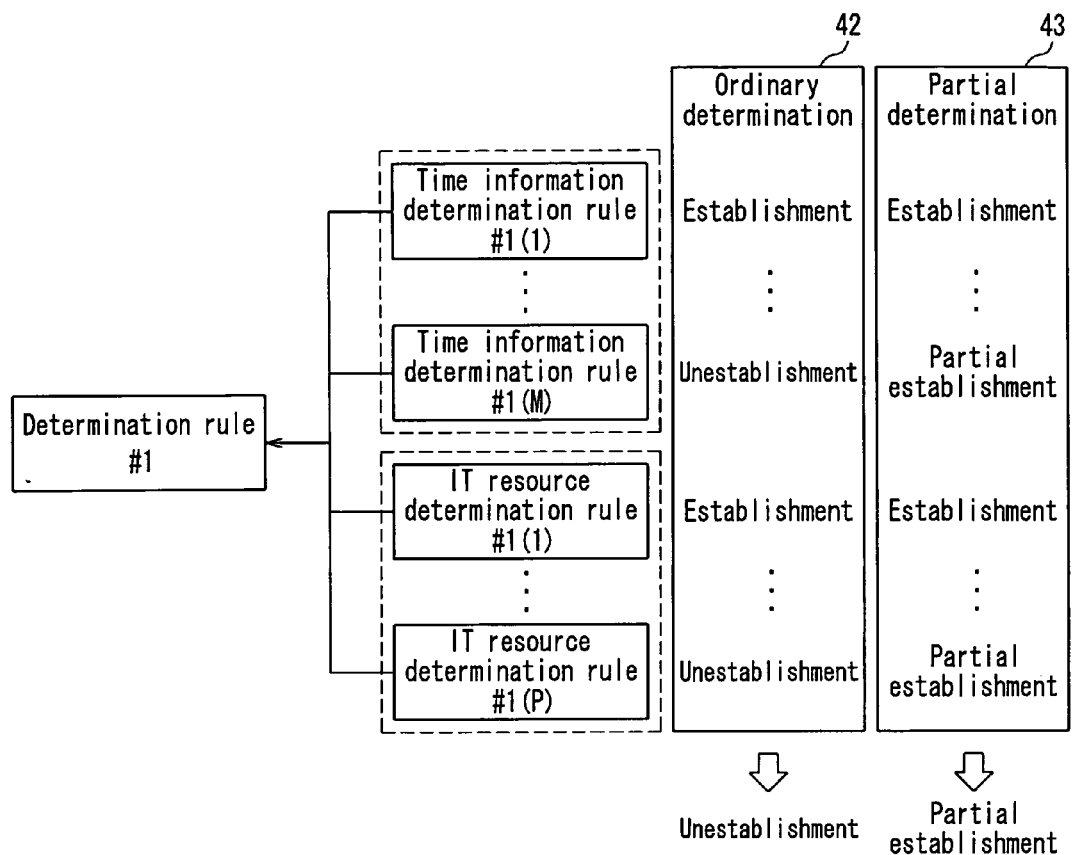
FIG. 14 shows an example of data in the case where a requirement described with a determination rule #1 contained in the surplus determination rule is established partially.

FIG. 14 shows an example of data in the case where the requirement described with the determination rule #1 contained in the surplus determination rule is established partially. In the example shown in FIG. 14, results 42 of ordinary determination in which the surplus determining part 25 determines whether or not there is a surplus, and results 43 of partial determination in which the surplus determining part 25 determines whether or not there is the possibility of the occurrence of a surplus are shown for each of the time information determination rules #1(1) to #1(M) and the IT resource determination rules #1(1) to #1(P).

In the ordinary determination, it is determined that the requirements represented by the time information determination rule #1(1) and the IT resource determination rule #1(1) are established, and the requirements represented by the time information determination rule #1(M) and the IT resource determination rule #1(P) are not established. In the case where even one unestablished rule is contained, the determination results by the determination rule #1 are regarded as the failure of an establishment as a whole, i.e., no surplus.

In the partial determination, it is determined that the requirements represented by the time information determination rule #1(1) and the IT resource determination rule #1(1) are established, and the requirements represented by the time information determination rule #1(M) and the IT resource determination rule #1(P) are established partially. Thus, in the case where a partial establishment is contained although there is no failure of an establishment, it is determined that there is a partial establishment, i.e., a possibility of the occurrence of a surplus as a whole.

Hereinafter, an exemplary case will be described where it is determined that there is a partial establishment in partial determination, while there is no failure of an establishment in ordinary determination. For example, the case where the requirement represented by the time information determination rule #1(M) shown in FIG. 14 is "continuous 12 hours" will be described. In the case where a period represented by working data at that time is, for example, continuous 6 hours, the requirement represented by the time information determination rule #1(M) can be considered to be partially established. Herein, although 6 hours are set as the requirement of a partial establishment, a value to be the requirement of a partial establishment can be appropriately set in accordance with the situation. For example, the setting part 31 can receive an input of a value to be the requirement of a partial establishment from the operating entity of the IT resource 7, and record it in the recording part 34 (not shown). For example, the value to be the requirement of a partial establishment can be set as 10 hours. Herein, the value obtained by dividing 12 hours of the time information determination rule #1(M) by 6 hours, which is an actual continuation time, is represented as 50%. At this time, the time information determination rule #1(M) can be expressed as being established by 50%.

Furthermore, for example, in the case where the requirement represented by the IT resource determination rule #1(P) shown in FIG. 14 is "a CPU use ratio of less than 80%", and a CPU use ratio represented by working data at that time is 85%, the requirement represented by the IT resource information determination rule #1(P) is considered to be established partially.

Furthermore, as another method of partial determination, for example, there is a method for determining the state, which is determined as a surplus if one more condition is satisfied, as the possibility of the occurrence of a surplus. As an exemplary state that is determined as a surplus if one more condition is satisfied, there is the case where only the time information determination rule #1(1) is not established, and the remaining time information determination rules #1(2) to 1(M), and the IT resource determination rules #1(1) to 1(P) are established in the determination rule #1 shown in FIG. 14.

Figure 15:
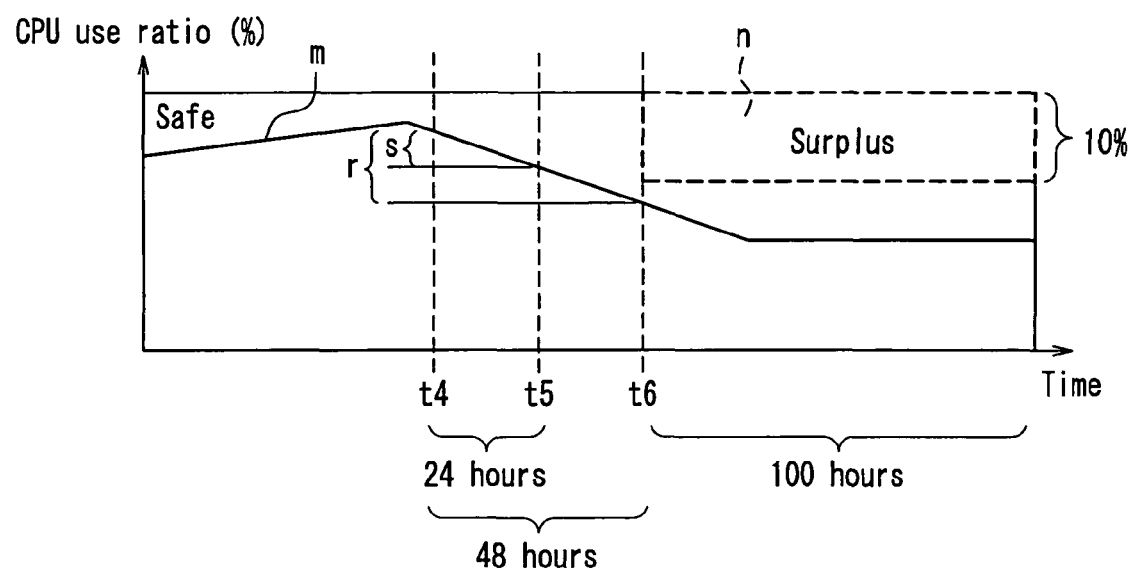
FIG. 15 is a graph showing the transition of a CPU use ratio.

FIG. 15 is a graph showing the transition of a CPU use ratio. A vertical axis represents a CPU use ratio (%), and a horizontal axis represents a time. A line m represents the transition of a CPU use ratio. An example of processing of determining the possibility of the occurrence of a surplus will be described with reference to the graph shown in FIG. 15. A time t5 represents a surplus determination time (at which the working data input part 32 inputs working data), and a time t4 represents a time 24 hours before the surplus determination time t5. A time t6 represents a time 24 hours after the surplus determination time t5.

An example of the case will be described where a condition "a CPU use ratio decreases by 20% over 48 hours" is set in the determination rule #1 contained in the surplus determination rule 28. As a requirement for the requirement represented by the determination rule #1 to be established partially, the condition that "a CPU use ratio decreases by 10% over 24 hours" is assumed to be set. In this case, a condition "48 hours" is described in the time information determination rule #1(M) of the determination rule #1, and a condition "a CPU use ratio decreases by 20%" is described in the IT resource determination rule #1(P). Herein, the requirement of the partial establishment of the time determination rule #1(M) is "24", and the requirement of the partial establishment of the IT resource determination rule #1(P) is "10%".

In the graph shown in FIG. 15, the transition of a CPU use ratio over 24 hours from the time t4 to the time t5 is presented by the working data 29. In the case where a decrease amount s of the CPU use ratio is 10% or more over 24 hours from the time t1 to the time t2, the surplus determining part 25 determines that the determination rule #1 is established partially, and hence, there is a possibility of the occurrence of a surplus. The submitting part 24 outputs the supply condition #1 corresponding to the determination rule #1 to the IT resource management system 10 as a predicted supply condition. The supply condition #1 describes, for example, the condition "10% of a CPU ability can be supplied for 100 hours". The supply condition #1 submitted as the predicted supply condition shows that a portion surrounded by a dotted line n can be supplied as a surplus IT resource in the graph.

At the time t6 after the elapse of 24 hours from the time t5, the surplus determining part 25 determines the presence/absence of a surplus based on the working data over 24 hours from the time t4 to the time t6. In the case where a decrease r of the CPU use ratio over 48 hours from the time t4 to the time t6 is 20% or more, the surplus determining part 25 determines that the determination rule #1 is established, and hence, there is a surplus. In response to this determination, the submitting part 24 outputs the supply condition #1 to the IT resource management system 10.

Thus, the submitting part 24 can submit the supply condition #1 to the IT resource management system 10 as a predicted supply condition at the time t5. Therefore, the submitting part 24 can output a supply condition before the time t6 when the determination rule #1 is all established. The submitting part 24 outputs the supply condition previously, whereby the supply condition is open to the public earlier to other operating entities of IT resources. Consequently, the needs on the demand side requiring an IT resource can be aroused.

Embodiment 3

Figure 16:
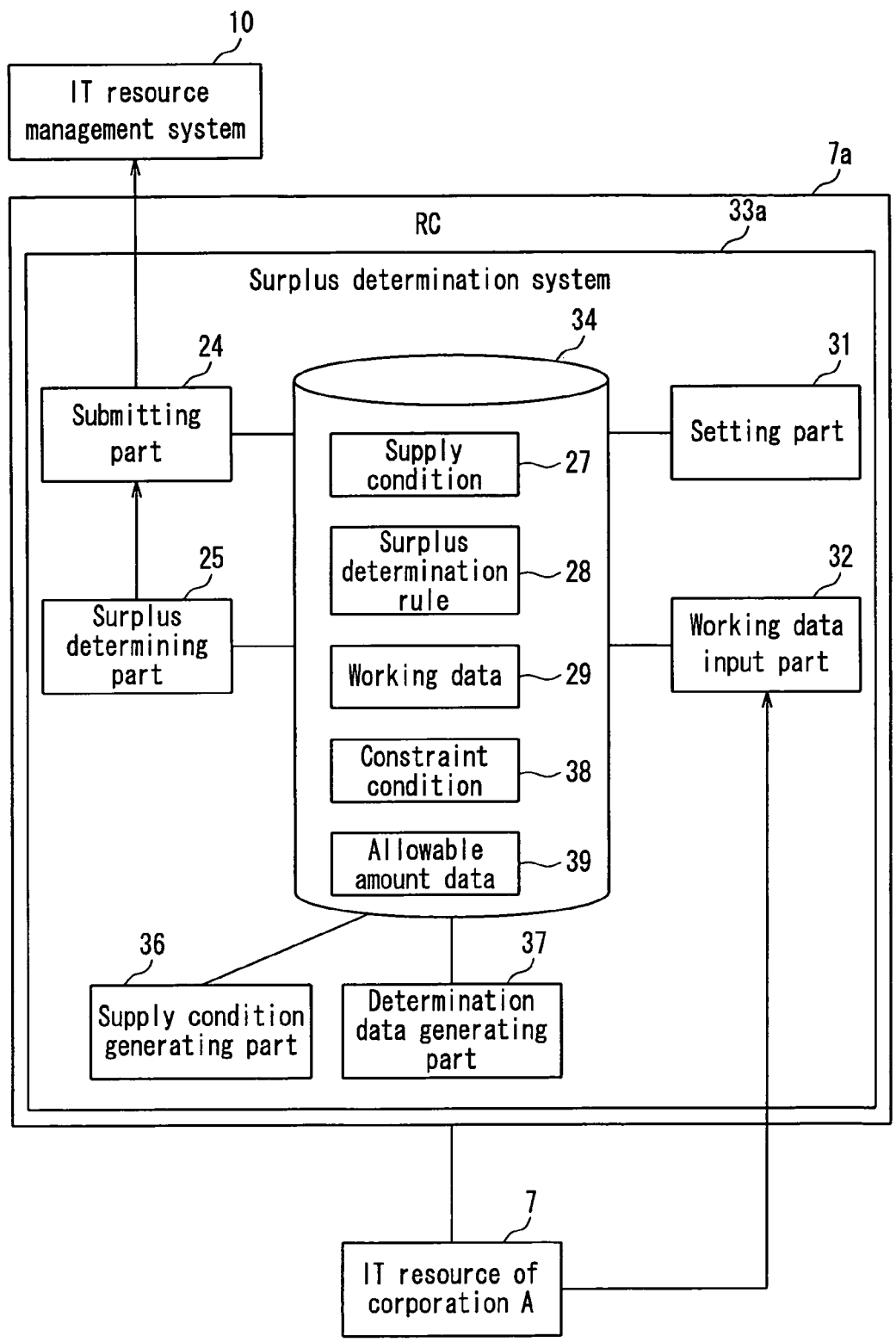
FIG. 16 is a functional block diagram showing a configuration of a surplus determination system according to Embodiment 3.

FIG. 16 is a functional block diagram showing a configuration of a surplus determination system according to Embodiment 3. A surplus determination system 33a shown in FIG. 16 further includes a supply condition generating part 36 and a determination data generating part 37. The recording part 34 further stores a constraint condition 38 and allowable amount data 39. For example, the setting part 31 receives inputs of the constraint condition 38 and the allowable amount data 39 from the operating entity of the IT resource 7, and record them in the recording part 34.

The allowable amount data 39 represents a maximum value of a working amount of an IT resource. The allowable amount data 39 contains, for example, the maximum values such as the maximum value of a CPU ratio, the maximum capacity of a hard disk, and the number of transactions that can be processed per day. The detail of the constraint condition 38 will be described later.

The determination data generating part 37 reads the supply condition 27 recorded in the recording part 34, the allowable amount data 39, and the constraint condition 38, and generate the supply condition 28 based on these data. The supply condition generating part 36 reads the surplus determination rule 28 recorded in the recording part 34, the allowable amount data 39, and the constraint condition 38, and generate the supply condition 27 based on these data and record it in the recording part 34.

The contents represented by the supply condition 27 and the contents represented by the surplus determination rule 28 have a correlation. For example, in the case there the supply condition "20% of a CPU ability can be supplied" is set, when "it is determined that there is a surplus resource if a CPU use ratio is less than 90%" is defined as the surplus determination rule 28, inconsistency is caused. According to the surplus determination rule 28, in the case where about 10% of a CPU use ratio is a surplus, it is determined that there is a surplus. However, the surplus of 10% in this case is smaller than 20% of the supply condition. More specifically, when only 10% of a CPU use ratio is a surplus, 20% of a CPU ability cannot be supplied. Thus, there is a relationship that the total of the amount that can be supplied, represented by the supply condition 27, and the surplus represented by the surplus determination rule does not exceed the maximum allowable amount of the IT resource.

Accordingly, the determination data generating part 37 can generate, for example, a surplus determination rule "it is determined that there is a surplus if a CPU use ratio is less than 60%", based on a supply condition "20% of a CPU ability can be supplied". Herein "a CPU use ratio is less than 80%" can be set to be a condition for determination. In this case, under the condition that the surplus CPU ability is 20%, 20% surplus CPU ability is supplied, with the result that a CPU works at a use ratio of 100%. It is dangerous that a CPU is allowed to work at a maximum allowable amount. Therefore, generally, the constraint condition 38 sets, for example, a condition "a margin of 20% is provided for working of a CPU". The determination data generating part 37 generates a surplus determination rule with the requirement for determining a surplus being less than 60%, based on the constraint condition 38.

Furthermore, as another example, if a surplus determination rule is a condition "it is determined that there is a surplus if a CPU use ratio continues to decreases for one day at 2%/hour", when a CPU use ratio decreases by 61.5% from the initial CPU use ratio, it is determined that there is a surplus. Assuming that the initial CPU use ratio is 30%, when the CPU use ratio becomes less than 18.5%, it is determined that there is a surplus. In this case, the supply condition generating part 36 can generate, for example, a supply condition "50% of a CPU resource is lent".

Next, the constraint condition 38 will be described. The constraint condition 38 is information representing the matter to be a constraint when the supply condition generating part 36 generates a supply condition or when the determination data generating part 37 generates a surplus determination rule. The constraint condition 38 contains margin data and unit data.

The margin data represents a minimum amount of the IT resource 7 to be kept in the business system. The margin data represents, for example, a remaining working amount obtained by subtracting the working amount of an IT resource that can be supplied, represented by a supply condition, and the working amount of an IT resource in a working situation described in a surplus determination rule, from the maximum working amount of an IT resource.

Figure 17A:
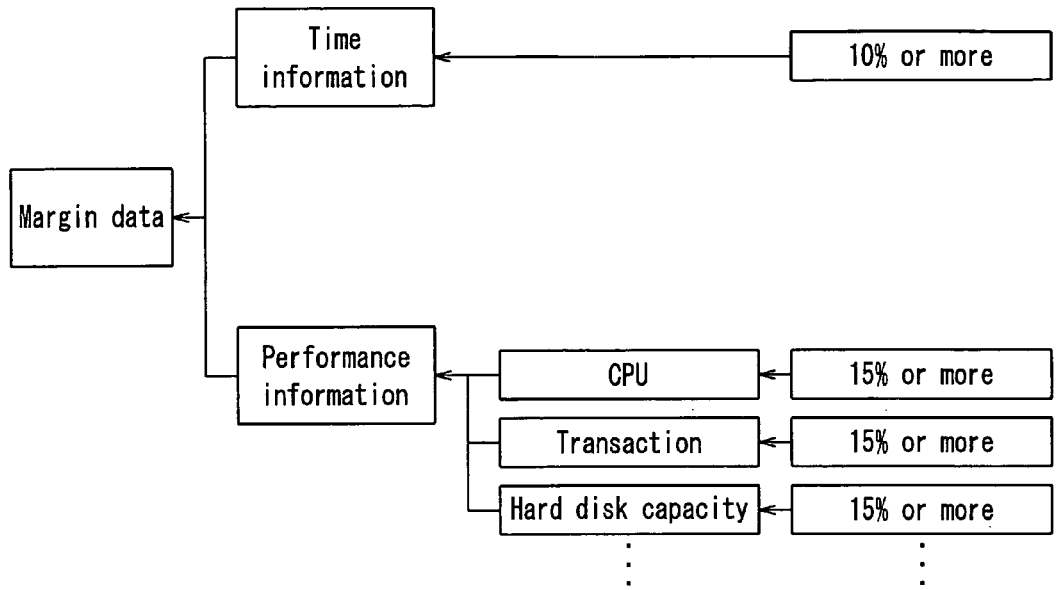
FIG. 17A shows an exemplary schema of margin data.

FIG. 17A shows an exemplary schema of margin data. In the example shown in FIG. 17A, margin data contains time information and performance information. A lower level of the performance information contains an IT resource and its value. Examples of the IT resource include a CPU use ratio, a hard disk capacity, and the number of transactions. As the value corresponding to each item, the margin amount to be kept in each IT resource is set. The margin amount is represented by a ratio with respect to the allowable amount in each IT resource, i.e., the maximum working amount.

Figure 17B:
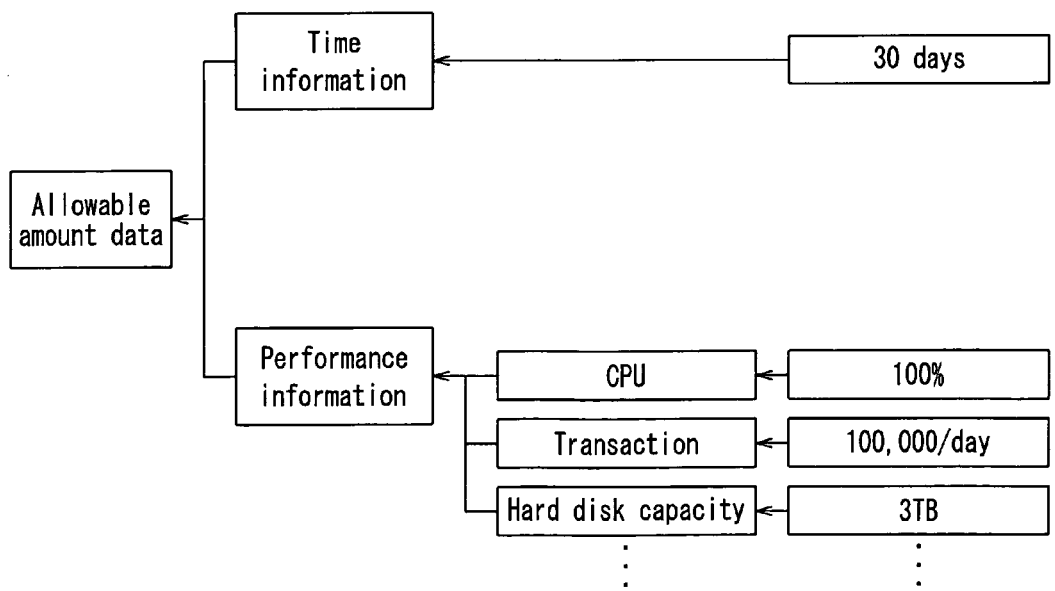
FIG. 17B shows an exemplary schema of allowable amount data.

FIG. 17B shows an exemplary schema of allowable amount data 39. In the example shown in FIG. 17B, the data configuration of the allowable amount data 39 is the same as that of the margin data. As the performance information, for example, the maximum value of the working amount of an IT resource, such as the maximum value of a CPU use ratio, a hard disk capacity, and the maximum value of the number of transactions, is set. As the time information, for example, the maximum value of a time during which an IT resource can be supplied or demanded continuously is set. More specifically, the allowable amount data 39 shown as an example in FIG. 17B determines the upper limit values of time information and performance information.

It is preferable that each item contained in the performance information shown in FIGS. 17A and 17B corresponds to, for example, IT resource information in a service policy of a supply condition (see FIG. 6), and each item of an IT resource determination rule in a determination rule contained in a surplus determination rule (see FIG. 9).

Next, unit data will be described. The unit data is, for example, information representing a minimum unit of increase/decrease when the IT resource 7 is increased/decreased by the IT resource management system 10. The unit data represents, for example, a minimum unit that cannot be divided any more when the IT resource 7 is divided and supplied to other operating entities.

Figures 18A, 18B:
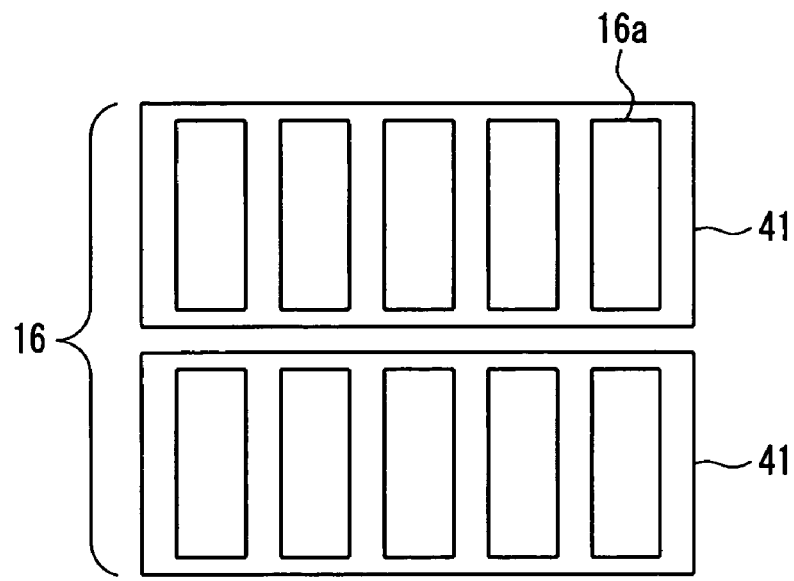
FIG. 18A is a schematic view showing a configuration of a blade server included in an IT resource.
FIG. 18B shows an example of a data configuration of unit data.

FIG. 18A is a schematic view showing a configuration of the blade server 16 contained in the IT resource 7. The blade server 16 is composed of two racks. Five server blades 16a are provided in each rack 41. More specifically, 10 server blades 16a are contained in the IT resource 7. Furthermore, each server blade 16a has a hard disk having a capacity of 300 GB. Furthermore, one server blade 16a can process 10,000 business transactions per day.

In the case where a part of the IT resource 7 with such a configuration is supplied, the part is supplied under the condition of being divided for each server blade 16a. Thus, for example, assuming that the ability of a CPU in the case where 10 server blades 16a work to the full (i.e., the maximum working amount) is 100%, the CPU ability can be increased/decreased in the unit of 10%. Therefore, the CPU ability represented by the supply condition becomes a discrete amount, instead of a continuous amount such as 10%, 20%, 30%, . . . , with respect to the maximum working amount. Even in the case where the working situation of the CPU use ratio is represented as a requirement in the surplus determination rule, the working situation becomes a discrete amount similarly. In this case, the minimum unit of the CPU use ratio or the CPU ability is 10%.

Furthermore, the hard disk capacity per apparatus is 300 GB, so that the minimum unit of a hard disk capacity is, for example, 300 GB. Similarly, the minimum unit of the number of transactions is, for example, 10,000 transactions/day. Herein, the minimum unit represented by the unit data is not limited to the minimum unit illustrated in the blade server 16 shown in FIG. 18A.

FIG. 18B shows an example of a data configuration of the unit data. Data representing an IT resource, a minimum unit, and a range respectively are recorded so as to be associated with each other.

Figure 19:
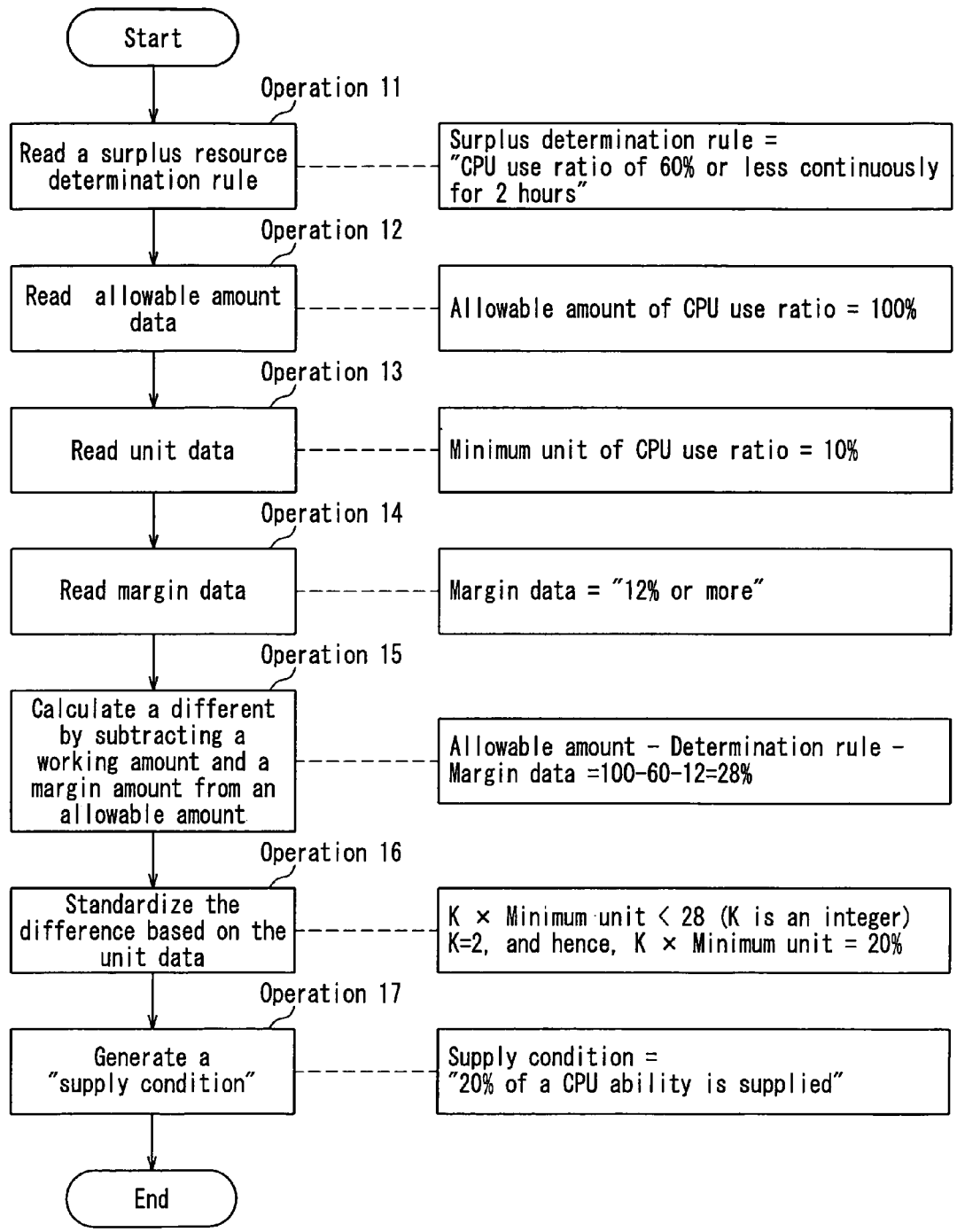
FIG. 19 shows a flow chart illustrating a flow of processing in which a supply condition generating part generates a supply condition and specific examples of data.

Next, the flow of processing in which the supply condition generating part 36 generates the supply condition 27 from the surplus determination rule 28 will be described. FIG. 19 shows a flow chart illustrating a flow of processing in which the supply condition generating part 36 generates the supply condition 27, and specific examples of data. In FIG. 19 regarding Operations 1 to 17, specific examples of data to be input or output in these operations are shown.

First, the supply condition generating part 36 reads a surplus determination rule recorded in the recording part 34 (Operation 11). The read surplus determination rule represents, for example, a condition: it is determined that there is a surplus in the case where "a CPU use ratio is 60% or less continuously for 2 hours".

The supply condition generating part 36 reads the allowable amount data 39 recorded in the recording part 34 (Operation 12). The read allowable amount data represents, for example, that the maximum working amount of a CPU is 100%.

The supply condition generating part 36 reads unit data contained in the constraint condition 38 recorded in the recording part 34 (Operation 13). The read unit data represents, for example, that the minimum unit of a CPU use ratio is 10%.

The supply condition generating part 36 reads margin data contained in the constraint condition 38 recorded in the recording part 34 (Operation 14). The read margin data represents, for example, that the margin to be provided to the CPU is 12% of the maximum working amount.

The supply condition generating part 36 calculates a difference by subtracting the working amount represented by the surplus determination rule and the working amount represented by the margin data from the allowable amount, using the maximum working amount of the CPU, the CPU use ratio to be the requirement in the surplus determination rule, and the margin to be provided to the CPU (Operation 15). This difference becomes a value representing the CPU ability that can be supplied. The CPU ability that can be supplied as a specific example is obtained by the following Expression (1):

$$\text{CPU ability that can be supplied} = \text{Maximum working amount of CPU (100\%)} - \text{Working amount represented by surplus determination rule (60\%)} - \text{margin to be provided to CPU (12\%)} = 28\% \quad (1)$$

The obtained CPU ability (28%) that can be supplied is not represented in a minimum unit when the CPU ability is supplied as an IT resource. More specifically, the CPU ability that can be supplied actually is limited to any value of 10%, 20%, ... 100%. Therefore, the obtained CPU ability (28%) needs to be standardized to an appropriate value among these values.

The supply condition generating part 36 standardizes the CPU ability (28%) that can be supplied, calculated in Operation 15, based on the minimum unit (10%) (Operation 16). The supply condition generating part 36 obtains, for example, a maximum value of an integer K satisfying the following Expression (2):

$$K \times \text{Minimum unit of CPU use ratio (10\%)} < \text{CPU ability that can be supplied (28\%)} \quad (2)$$

A maximum value KMAX of an integer K satisfying the above Expression (2) is 2. The value standardized with the minimum unit is obtained by the following Expression (3):

$$K\text{MAX} \times \text{Minimum unit of CPU use ratio (10\%)} = 20\% \quad (3)$$

Thus, the value (20%) obtained from the above Expression (3) becomes a standardized CPU ability that can be supplied.

The supply condition generating part 36 generates a supply condition based on the CPU ability obtained in Operation 16 (Operation 17). As a result, for example, the supply condition 27 representing that "20% of a CPU ability is supplied" is generated. The generated supply condition 27 is recorded in the recording part 34. Owing to the above processing, for example, in the case where the operating entity of the IT resource 7 inputs the surplus determination rule 28 via the setting part 31, the supply condition generating part 36 can automatically generate the supply condition 27, using the input surplus determination rule 28.

Figure 20:
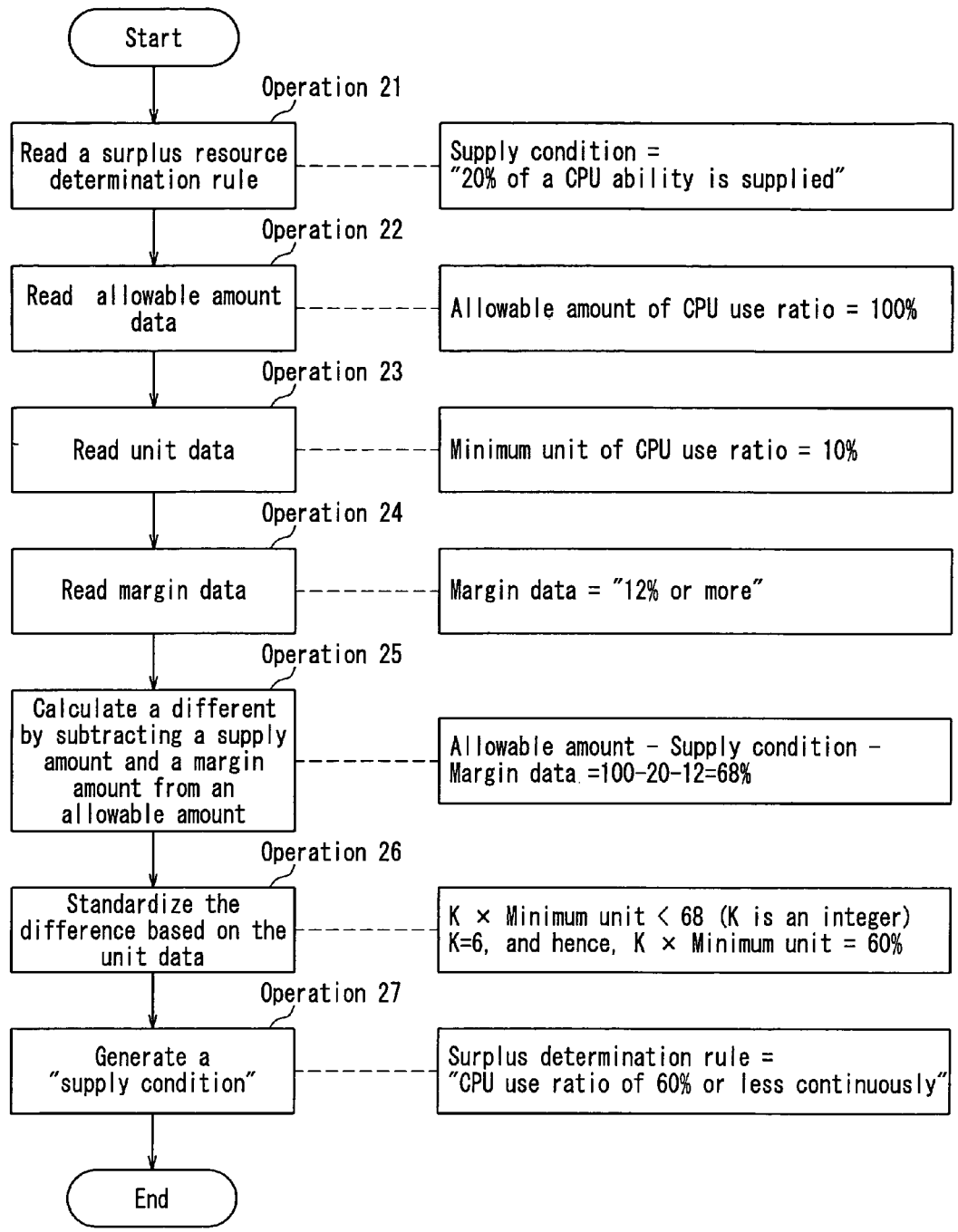
FIG. 20 shows a flow chart illustrating a flow of processing in which a determination data generating part generates a surplus determination rule, and specific examples of data.

Next, a flow of processing in which the determination data generating part 37 generates the surplus determination rule 28 from the supply condition 27 will be described. FIG. 20 shows a flow chart illustrating a flow of processing in which the determination data generating part 37 generates the surplus determination rule 28 and specific examples of data. In FIG. 20, regarding the respective Operations 21 to 27, specific examples of data to be input or output in these operations are shown.

First, the determination data generating part 37 reads the supply condition 27 recorded in the recording part 34 (Operation 21). The read supply condition represents, for example, a condition "20% of a CPU ability is supplied".

The determination data generating part 37 reads the allowable amount data 39 recorded in the recording part (Operation 22). The read allowable amount data represents, for example, that the maximum working amount of a CPU is 100%.

The determination data generating part 37 reads unit data contained in the constraint condition 38 recorded in the recording part 34 (Operation 23). The read unit data represents, for example, that the minimum unit of a CPU use ratio is 10%.

The determination data generating part 37 reads margin data contained in the constraint condition 38 recorded in the recording par 34 (Operation 24). The read margin data represents that the margin to be provided to the CPU is 12% of the maximum working amount.

The determination data generating part 37 calculates a difference by subtracting the CPU ability that can be supplied and the working amount represented by the margin data from the allowable amount, using the maximum working amount of the CPU, the CPU ability that can be supplied, represented by the supply condition, and the margin to be provided to the CPU (Operation 25). This difference becomes a value representing a CPU use ratio to be the requirement for determining that there is a surplus. As a specific example, the CPU use ratio to be the requirement is obtained by the following Expression (4):

$$\text{CPU use ratio to be the requirement} = \text{Maximum working amount of CPU (100\%)} - \text{CPU ability that can be supplied (20\%)} - \text{Margin to be supplied to CPU (12\%)} = 68\%. \quad (4)$$

The determination data generating part 37 standardizes the CPU use ratio (68%) to be the requirement calculated in Operation 25, based on the minimum unit (10%) (Operation 26). The determination data generating part 37 obtains the maximum value of the integer K satisfying the following Expression (5):

$$K \times \text{Minimum unit of CPU use ratio (10\%)} < \text{CPU use ratio to be the requirement (68\%)} \quad (5)$$

The maximum value KMAX of the integer K satisfying the above Expression (5) is 6. The value standardized with the minimum unit is obtained by the following Expression (6):

$$K\text{MAX} \times \text{Minimum unit of CPU use ratio (10\%)} = 60\% \quad (6)$$

Thus, the value (60%) obtained from the above Expression (6) is a CPU use ratio to be the standardized requirement.

The determination data generating part 37 generates a surplus determination rule 28 based on the CPU use ratio obtained in Operation 26 (Operation 27). Because of this, for example, the surplus determination rule 28 is generated, which represents the condition: it is determined that there is a surplus in the case where "a CPU use ratio is 60% or less". The generated surplus determination rule 28 is recorded in the recording part 34. Owing to the above processing, for example, in the case where the operating entity of the IT resource 7 inputs the supply condition 27 via the setting part 31, the determination data generating part 37 can automatically generate the surplus determination rule 28, using the input supply condition 27.

The present invention is useful, for example, as an IT resource management system capable of enhancing the use efficiency of an IT resource in an IDC or the like.

The invention may be embodied in other forms without departing from the spirit or essential characteristics thereof. The embodiments disclosed in this application are to be considered in all respects as illustrative and not limiting. The scope of the invention is indicated by the appended claims rather than by the foregoing description, and all changes which come within the meaning and range of equivalency of the claims are intended to be embraced therein.

What is claimed is:

1. A surplus determination system that includes a computer for determining a presence/absence of a surplus in an IT resource, the surplus determination system to be connected to a management system that includes a computer, among a plurality of IT resources working respectively in a plurality of business systems each having a computer operated independently, operating a surplus of the IT resource in any one of the business systems to another business system that lacks the IT resource, the surplus determination system comprising:
   a working data recording part to record working data representing a working situation of the IT resource;
   a surplus determination data recording part to record surplus determination data in which a surplus determination rule representing a requirement of the working situation for the IT resource to be determined to have a surplus and a period targeted for determination of a presence/absence of a surplus is described;
   a surplus determining part to read the working data recorded in the working data recording part and the surplus determination data recorded in the surplus determination data recording part, and to determine a presence/absence of a surplus in the IT resource, based on whether or not the working situation represented by the working data corresponding to the period included in the surplus determination rule satisfies the requirement of the working situation represented by the surplus determination rule;
   a supply condition recording part to record supply condition data representing a supply condition under which the management system supplies the surplus of the IT resource in any one of the business systems among the plurality of business systems to another business system, and to contain at least data representing an amount that can be supplied in the surplus;
   a submitting part to output the supply condition data recorded in the supply condition recording part to the management system, in a case where the surplus determining part determines that there is a surplus; and
   a partial data recording part to record partial data representing a partial requirement partially satisfying the requirement of the working situation represented by the surplus determination rule,
   wherein the surplus determining part to read the working data recorded in the working data recording part, the surplus determination data recorded in the surplus determination data recording part, and the partial data recorded in the partial data recording part, and to determine a presence/absence of a possibility of occurrence of a surplus, based on whether or not the working situation represented by the working data satisfies the partial requirement represented by the partial data in the requirement of the working situation represented by the surplus determination rule, and
   the submitting part to output the supply condition data recorded in the supply condition recording part to the management system as a predicted supply condition, in a case where the surplus determining part determines that there is a possibility of occurrence of a surplus.

2. The surplus determination system according to claim 1, further comprising:
   an allowable amount data recording part to record allowable amount data representing a maximum value of a working amount of the IT resource; and
   a determination data generating part to generate the surplus determination data, based on the allowable amount data recorded in the allowable amount data recording part and the supply condition data recorded in the supply condition recording part.

3. The surplus determination system according to claim 1, further comprising:
   an allowable amount data recording part to record allowable amount data representing a maximum value of a working amount of the IT resource; and
   a supply condition generating part to generate the supply condition data, based on the allowable amount data recorded in the allowable amount data recording part and the surplus determination data recorded in the surplus determination data recording part.

4. The surplus determination system according to claim 3, further comprising a constraint condition recording part to record at least either one of unit data representing a unit of the IT resource supplied by the management system and margin data representing an amount of the IT resource to be kept in each of the plurality of business systems,
   wherein the supply condition generating part to generate the supply condition data, using at least one of the margin data and the unit data recorded in the constraint condition recording part as a constraint condition.

5. The surplus determination system according to claim 2, further comprising a constraint condition recording part to record at least either one of unit data representing a unit of the IT resource supplied by the management system and margin data representing an amount of the IT resource to be kept in each of the plurality of business systems,
   wherein the determination data generating part to generate the surplus determination data, using either one of the margin data and the unit data recorded in the constraint condition recording part as a constraint condition.

6. The management system constituted with a computer connected to the surplus determination system of claim 1, comprising:
   a supply condition accumulating part to accumulate the supply condition data output from the submitting part of the surplus determination system;
   a demand condition accumulating part to accumulate demand condition data representing a demand condition under which the business system that lacks the IT resource demands a shortage of the IT resource;
   a matching part to extract supply condition data and demand condition data that are matched with each other, from the supply condition data accumulated in the supply condition accumulating part and the demand condition data accumulated in the demand condition accumulating part; and
   an assigning part to set the IT resource that can be supplied, represented by the supply condition data extracted by the matching part in a state workable by the business system related to the demand condition data extracted by the matching part.

7. A non-transitory recording medium storing a surplus determination program that allows a computer to execute processing of determining a presence/absence of a surplus in an IT resource, the computer being connected to a management system having a function of, among a plurality of IT resources working respectively in a plurality of business systems operated independently, supplying a surplus of the IT resource in any one of the business systems to another business system that lacks the IT resource, the program allowing the computer to execute a process comprising:

inputting working data representing a working situation of the IT resource and recording it in a working data recording part;

recording surplus determination data, in which a surplus determination rule representing a requirement of the working situation for the IT resource to be determined to have a surplus and a period targeted for determination of a presence/absence of a surplus is described, in a surplus determination data recording part; and reading the working data recorded in the working data recording part and the surplus determination data recorded in the surplus determination data recording part;

determining a presence/absence of a surplus in the IT resource, based on whether the working situation represented by the working data corresponding to the period included in the surplus determination rule satisfies the requirement of the working situation represented by the surplus determination rule;

recording supply condition data representing a supply condition under which the management system supplies the surplus of the IT resource in any one of the business systems among the plurality of business systems to another business system, and containing at least data representing an amount that can be supplied in the surplus, in a supply condition recording part;

outputting the supply condition data recorded in the supply condition recording part to the management system, in a case where it is determined that there is a surplus in the surplus determining processing;

reading the working data recorded in the working data recording part, the surplus determination data recorded in the surplus determination data recording part, and partial data recorded in a partial data recording part representing a partial requirement partially satisfying the requirement of the working situation represented by the surplus determination rule;

determining a presence/absence of a possibility of occurrence of a surplus, based on whether or not the working situation represented by the working data satisfies the partial requirement represented by the partial data in the requirement of the working situation represented by the surplus determination rule, and outputting the supply condition data recorded in the supply condition recording part to the management system as a predicted supply condition, in a case where the surplus determining part determines that there is a possibility of occurrence of a surplus.

8. A non-transitory recording medium storing a management program that allows a computer connected to the surplus determination system of claim 1 to execute processing of, among a plurality of IT resources working respectively in a plurality of business systems operated independently, supplying a surplus of the IT resource in any one of the business systems to another business system that lacks the IT resource, the program allowing the computer to execute:

supply condition accumulating processing of accumulating the supply condition data output from the submitting part of the surplus determination system in a recording part;

demand condition accumulating processing of accumulating demand condition data representing a demand condition under which the business system that lacks the IT resource demands a shortage of the IT resource, in the recording part;

matching processing of extracting supply condition data and demand condition data that are matched with each other, from the supply condition data and the demand condition data accumulated in the recording part; and assigning processing of setting the IT resource that can be supplied, represented by the supply condition data extracted in the matching processing in a state workable by the business system related to the demand condition data extracted in the matching processing.

9. The surplus determination system according to claim 1, wherein the surplus determination data describes a plurality of the surplus determination rules and periods and each surplus determination rule is linked to the corresponding supply condition, and the submitting part outputs the supply condition data linked to the corresponding surplus determination rule based on which the surplus determining part determines the presence of the surplus.

10. The surplus determination system according to claim 9, wherein the surplus determination data has a hierarchical structure that includes the plurality of the surplus determination rules and top of the hierarchy of each surplus determination rule is linked to the corresponding supply condition.

* * * * *